US008275199B2

(12) United States Patent
Tamagawa

(10) Patent No.: US 8,275,199 B2
(45) Date of Patent: Sep. 25, 2012

(54) COLOR PROCESSING APPARATUS AND COLOR PROCESSING METHOD

(75) Inventor: Kei Tamagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1002 days.

(21) Appl. No.: 11/950,520

(22) Filed: Dec. 5, 2007

(65) Prior Publication Data

US 2008/0137948 A1 Jun. 12, 2008

(30) Foreign Application Priority Data

Dec. 12, 2006 (JP) .................................. 2006-335076

(51) Int. Cl.
*G06K 9/00* (2006.01)
(52) U.S. Cl. ......... 382/167; 382/162; 382/165; 382/274
(58) Field of Classification Search .................. 382/162, 382/165, 167, 274; 358/1.9, 1.15, 518, 519, 358/523, 520, 530; 345/589, 690, 691, 591
See application file for complete search history.

(56) References Cited

U.S. PATENT DOCUMENTS

| 5,299,291 | A | 3/1994 | Ruetz | 395/109 |
|---|---|---|---|---|
| 5,438,649 | A | 8/1995 | Ruetz | 395/109 |
| 5,500,921 | A | 3/1996 | Ruetz | 395/109 |
| 5,574,666 | A | 11/1996 | Ruetz et al. | 364/526 |
| 6,297,826 | B1* | 10/2001 | Semba et al. | 345/589 |
| 7,177,465 | B1 | 2/2007 | Takahira | 382/166 |
| 7,190,487 | B2* | 3/2007 | Dalrymple et al. | 358/1.9 |
| 7,595,784 | B2* | 9/2009 | Yamamoto et al. | 345/102 |
| 7,903,870 | B1* | 3/2011 | Budagavi | 382/162 |
| 2006/0041556 | A1* | 2/2006 | Taniguchi et al. | 707/10 |
| 2006/0232803 | A1* | 10/2006 | Hori et al. | 358/1.9 |

FOREIGN PATENT DOCUMENTS

| JP | 6-225132 | 8/1994 |
|---|---|---|
| JP | 6-233129 | 8/1994 |
| JP | 6-233132 | 8/1994 |
| JP | 7-323614 | 12/1995 |
| JP | 2001-36757 | 2/2001 |
| JP | 2004-343797 | 12/2004 |
| JP | 2005-117096 | 4/2005 |
| JP | 2006-180062 | 7/2006 |
| JP | 2006-203526 | 8/2006 |
| JP | 2008-124750 | 5/2008 |

OTHER PUBLICATIONS

Japanese Office Action dated May 20, 2011 in corresponding Japanese Application No. 2006-335076.

* cited by examiner

*Primary Examiner* — Ali Bayat
(74) *Attorney, Agent, or Firm* — Fitzpatrick, Cella, Harper & Scinto

(57) ABSTRACT

Upon creating a color conversion table from a first color space to a second color space, a reversal region where hues are reversed is detected from at least one color gamut in step S2, and the reversal region is corrected in step S3. Mapping is done based on the corrected color gamut in step S4, thereby creating an appropriate color conversion table that suppresses any hue reversal.

13 Claims, 32 Drawing Sheets

FIG. 3

| GRID POINT NUMBER | R | G | B | J | a | b |
|---|---|---|---|---|---|---|
| 1 | 0 | 0 | 0 | ##.# | ##.# | ##.# |
| 2 | 0 | 0 | 64 | ##.# | ##.# | ##.# |
| ⋮ | ⋮ | ⋮ | ⋮ | ⋮ | ⋮ | ⋮ |
| 124 | 255 | 255 | 192 | ##.# | ##.# | ##.# |
| 125 | 255 | 255 | 255 | ##.# | ##.# | ##.# |

• GRID POINT

FIG. 9

| GRID POINT NUMBER | NUMBER OF INTERSECTIONS |
|---|---|
| 1 | 1 |
| 2 | 1 |
| 3 | 3 |
| 4 | 2 |
| 5 | 2 |
| 6 | 1 |
| 7 | 1 |
| ⋮ | ⋮ |

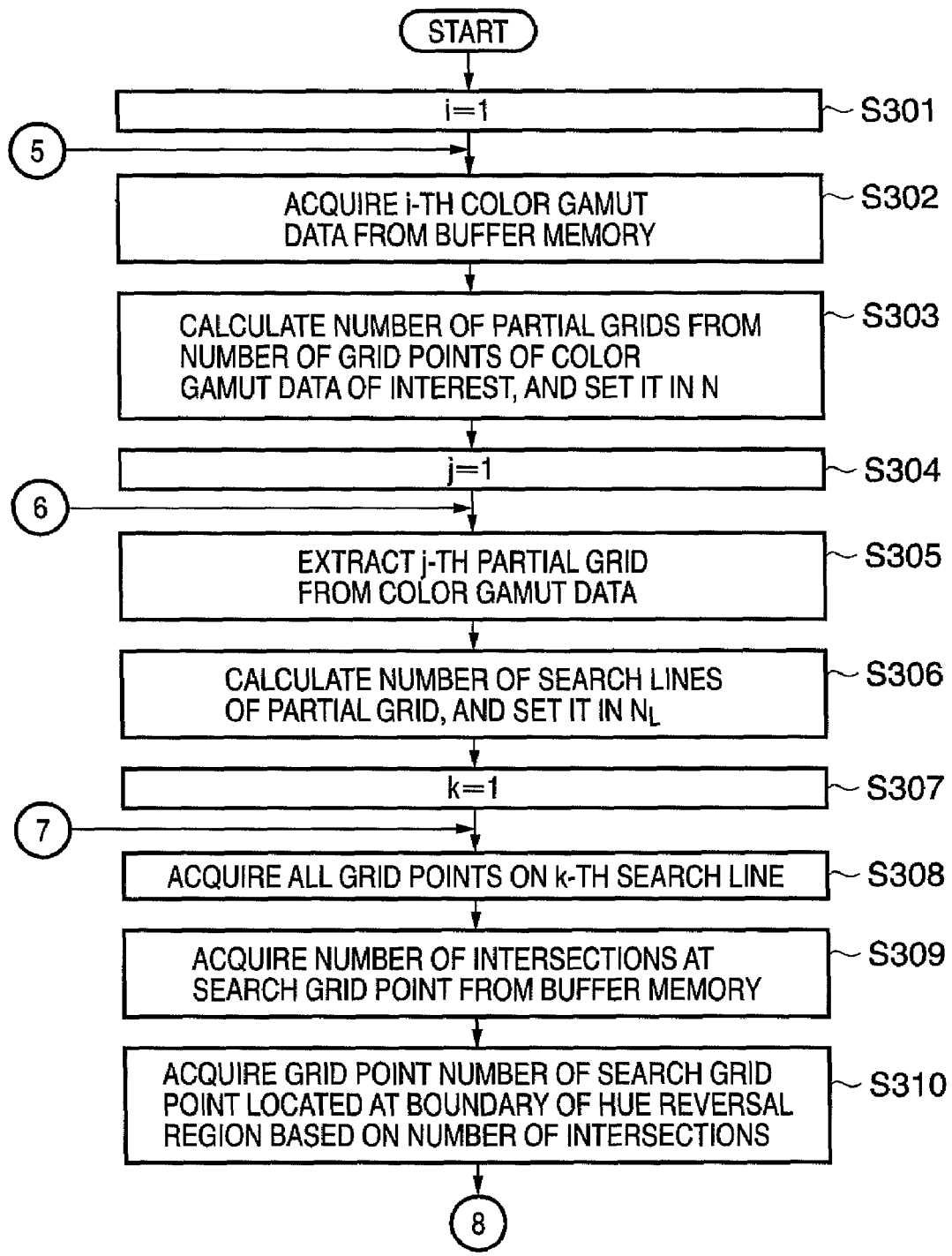

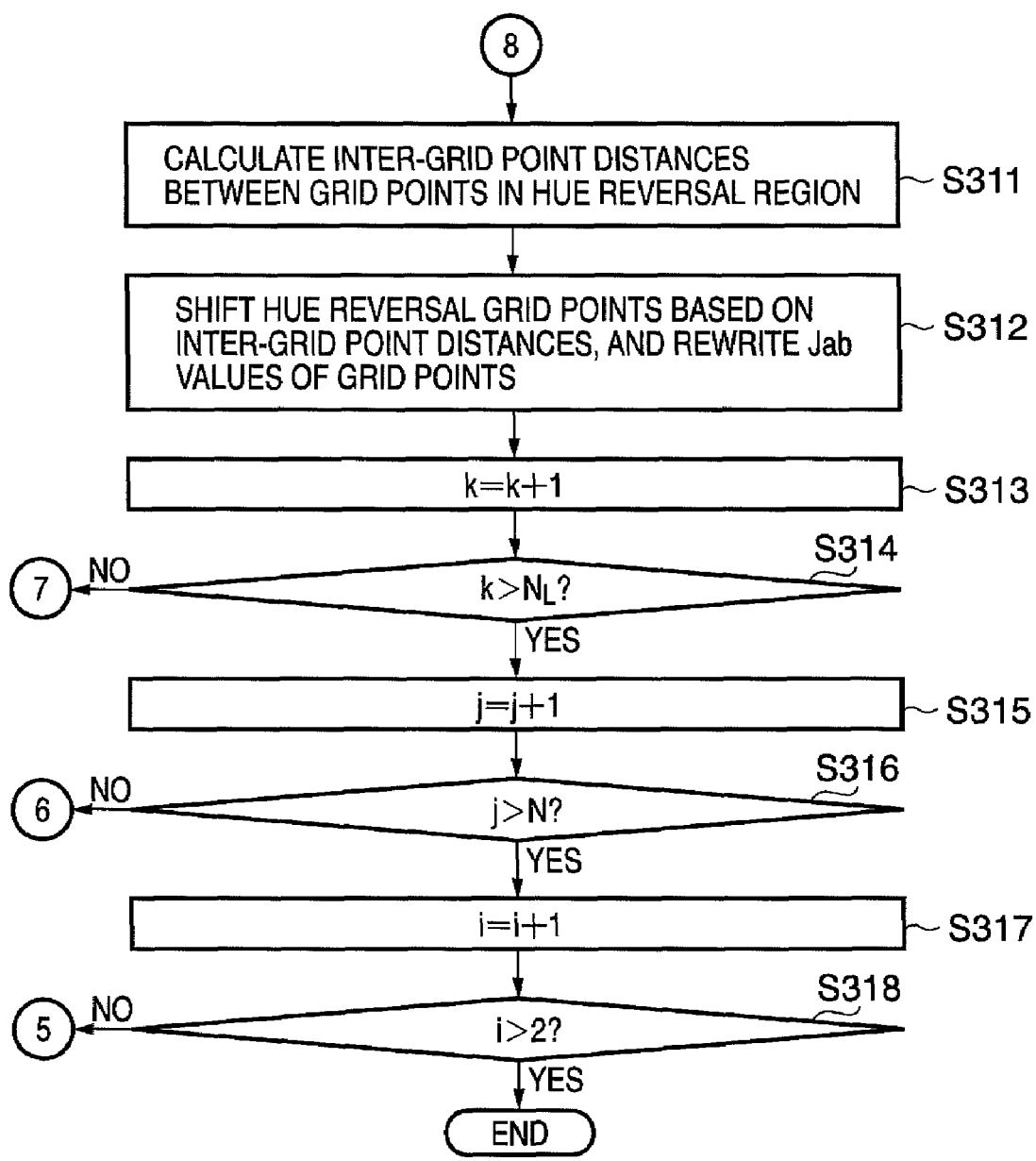

COLOR PROCESSING APPARATUS AND COLOR PROCESSING METHOD

BACKGROUND OF THE INVENTION

1. Field of the Invention

The present invention relates to a color processing apparatus and color processing method and, more particularly, to a color processing apparatus and color processing method, which create a color conversion table by mapping between color gamuts.

2. Description of the Related Art

In recent years, opportunities to output images acquired by a digital camera, scanner, or the like using printers are increasing. These images acquired by the digital camera, scanner, or the like are temporarily stored as data on an RGB color space of an input device. However, since this RGB color space depends on each device, the images are converted into color space data such as an sRGB color space as a standard color space, an AdobeRGB color space, or the like, and the converted data are saved. An x-y chromaticity diagram in FIG. 22 shows the color reproduction range (color gamut) of the sRGB color space. In FIG. 22, a triangular region Rs indicated by the dotted line represents an sRGB color gamut. A horseshoe-shaped region Rv indicated by the solid curve represents a range visible to the human eye, and a curved region Rp indicated by the broken curve represents a color gamut of a general printer. As shown in FIG. 22, since the sRGB color gamut Rs is different from the printer color gamut Rp, for example, when an sRGB image is output using the printer, the sRGB color signal value must be associated with that of the printer so as to correct the color gamut difference. This association processing is called color gamut mapping.

Color gamut mapping will be explained below with reference to FIG. 23 taking color conversion processing of an RGB image as an example. In the following description, sRGB will be exemplified as an input color space. In step S1M, a perceived color space value of a pixel value RGB of an sRGB image is calculated. As the perceived color space, for example, CIELAB, CIELUV, CIECAM02, and the like are available. In the following description, as the perceived color space value, a color values Jab on the CIECAM02 color space is used. In step S2M, conversion is applied to the color value Jab to fall within the color gamut of an output device on the perceived color space. The association processing between the input and output color values in step S2M is generally called color gamut mapping. Finally, in step S3M, the color value after mapping is converted into an output device value R'G'B'.

As techniques for color gamut mapping to be executed in step S2M, various methods such as convergence point mapping, minimum color difference mapping, and the like have been proposed to date.

For example, according to the technique of convergence point mapping, an input color value within an output color gamut is maintained. On the other hand, as for an input color value which falls outside the output color gamut, a certain convergence point PF is set in the output color gamut, a line segment that connects the convergence point and input color value is assumed, and the input color value is shifted to a point between the convergence point and an intersection with the boundary of the output color gamut, as shown in FIG. 24. As a practical example, the following method has been disclosed (e.g., Japanese Patent Laid-Open No. 2001-036757 (U.S. Pat. No. 7,177,465)). That is, a maximum saturation point at an arbitrary hue in an input color gamut is shifted to a predetermined point at that hue along an equi-hue plane, and the color value within the input color gamut at that hue is nonlinearly mapped to those within the output color gamut. According to this method, the color value in the input color gamut can be reproduced by that in the output color gamut while preserving its hue.

According to the technique of minimum color difference mapping, an input color value within the output color gamut is also maintained. On the other hand, as for an input color value outside the output color gamut, the input color value is pasted on a point Pin' where a three-dimensional (3D) distance between the input color value and the boundary surface is minimum, i.e., a point where the color difference before and after mapping is minimum, as shown in FIG. 25. As a practical example, a method of pasting an input color value on a point vertically drawn from the input color value to the boundary surface upon mapping an input color value outside the output color gamut has been disclosed (for example, see Japanese Patent Laid-Open No. 2005-117096). According to this method, upon outputting an input color value, it can be reproduced by a color value which is perceptually closest to the input color value.

The conventional color gamut mapping is effective to realize satisfactory color reproduction when the color gamut of an output device is smaller than that of an input device. However, depending on the color gamut shapes of the input and output color spaces, when an input color value is expressed by a perceived color space value, a hue (tone) is often reserved upon expression.

FIG. 26 shows an example of hue reversal. In FIG. 26, the solid curve represents an input color gamut boundary, which connects Cyan, Blue, and Magenta maximum saturation points of an input device, and points P1, P2, P3, and P4 represent grid points on the input color gamut boundary. As shown in FIG. 26, on this color gamut, a hue is apparently reversed in a section from the point P1 to the point P4. For this reason, when a color outside the output color gamut is pasted on the boundary surface using the convergence point mapping, regions P1-P2, P2-P3, and P3-P4 are mapped on the identical surface of the output color gamut. Therefore, the tone collapses after mapping, and pseudo edges are generated on an output image, thus causing considerable deterioration of image quality.

SUMMARY OF THE INVENTION

The present invention has been made to solve the aforementioned problems, and has as its object to provide a color processing apparatus and color processing method, which prevent occurrence of hue reversal due to color gamut mapping.

According to one aspect of the present invention, there is provided a color processing apparatus comprising:

an acquisition unit adapted to acquire color gamut information;

a detection unit adapted to detect a reversal region where tones are reversed at a boundary of a color gamut indicated by the color gamut information;

a correction unit adapted to correct the color gamut based on the detected reversal region; and a gamut mapping unit adapted to execute gamut mapping for input colors based on the corrected color gamut.

According to another aspect of the present invention, there is provided a color processing method comprising:

an acquisition step of acquiring color gamut information;

a detection step of detecting a reversal region where tones are reversed at a boundary of a color gamut indicated by the color gamut information;

a correction step of correcting the color gamut based on the detected reversal region; and a gamut mapping step of executing gamut mapping for input colors based on the corrected color gamut.

According to still another aspect of the present invention, there is provided a computer-readable storage medium storing a program for making a computer execute:

an acquisition step of acquiring color gamut information;

a detection step of detecting a reversal region where tones are reversed at a boundary of a color gamut indicated by the color gamut information;

a correction step of correcting the color gamut based on the detected reversal region; and a gamut mapping step of executing gamut mapping for input colors based on the corrected color gamut.

Further features of the present invention will become apparent from the following description of exemplary embodiments with reference to the attached drawings.

BRIEF DESCRIPTION OF THE DRAWINGS

FIG. 3 shows an example of color gamut data according to the first embodiment;

FIG. 9 shows an example of a correspondence table between the grid point numbers and the numbers of intersections according to the first embodiment;

FIGS. 10A and 10B are flowcharts each showing region correction processing according to the first embodiment;

DESCRIPTION OF THE EMBODIMENTS

Preferred embodiments of the present invention will be described in detail hereinafter with reference to the accompanying drawings. Note that the arrangements presented in the following embodiments are merely examples, and the present invention is not limited to the illustrated arrangements.

First Embodiment

Figure 1:
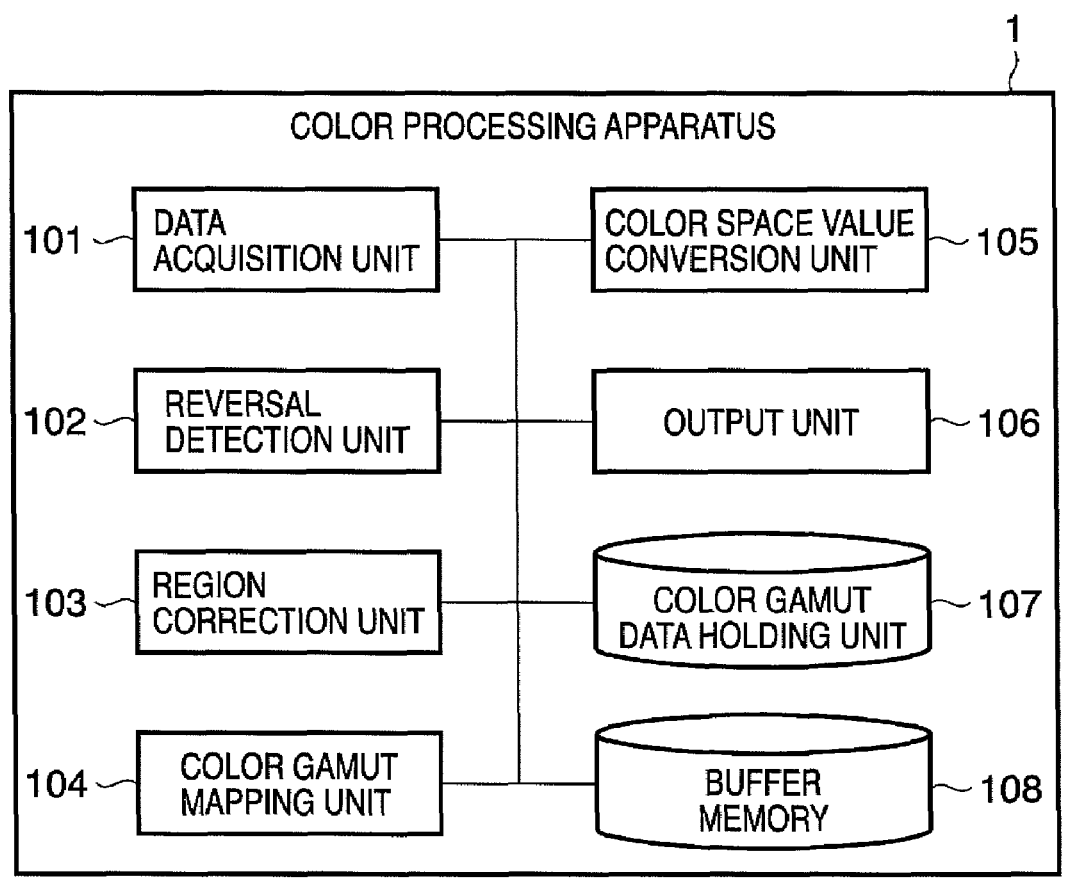
FIG. 1 is a block diagram showing the arrangement of a color processing apparatus according to the first embodiment of the present invention.

FIG. 1 is a block diagram showing the hardware arrangement which implements a color processing apparatus of this embodiment. In a color processing apparatus 1 shown in FIG. 1, reference numeral 101 denotes a data acquisition unit which acquires color gamut data; 102, a reversal detection unit which detects a hue reversal region of a color gamut acquired by the data acquisition unit 101; and 103, a region correction unit which corrects the reversal region detected by the reversal detection unit 102. Reference numeral 104 denotes a color gamut mapping unit which maps the color gamut corrected by the region correction unit 103; and 105, a color space value conversion unit which converts the color gamut mapped by the color gamut mapping unit 104 into color space values of an output device. Reference numeral 106 denotes an output unit which outputs color space values converted by the color space value conversion unit 105; 107, a color gamut data holding unit which holds color gamut data to be read by the data acquisition unit 101; and 108, a buffer memory which temporarily holds intermediate data in arithmetic operations.

Processing Overview

Figure 2:
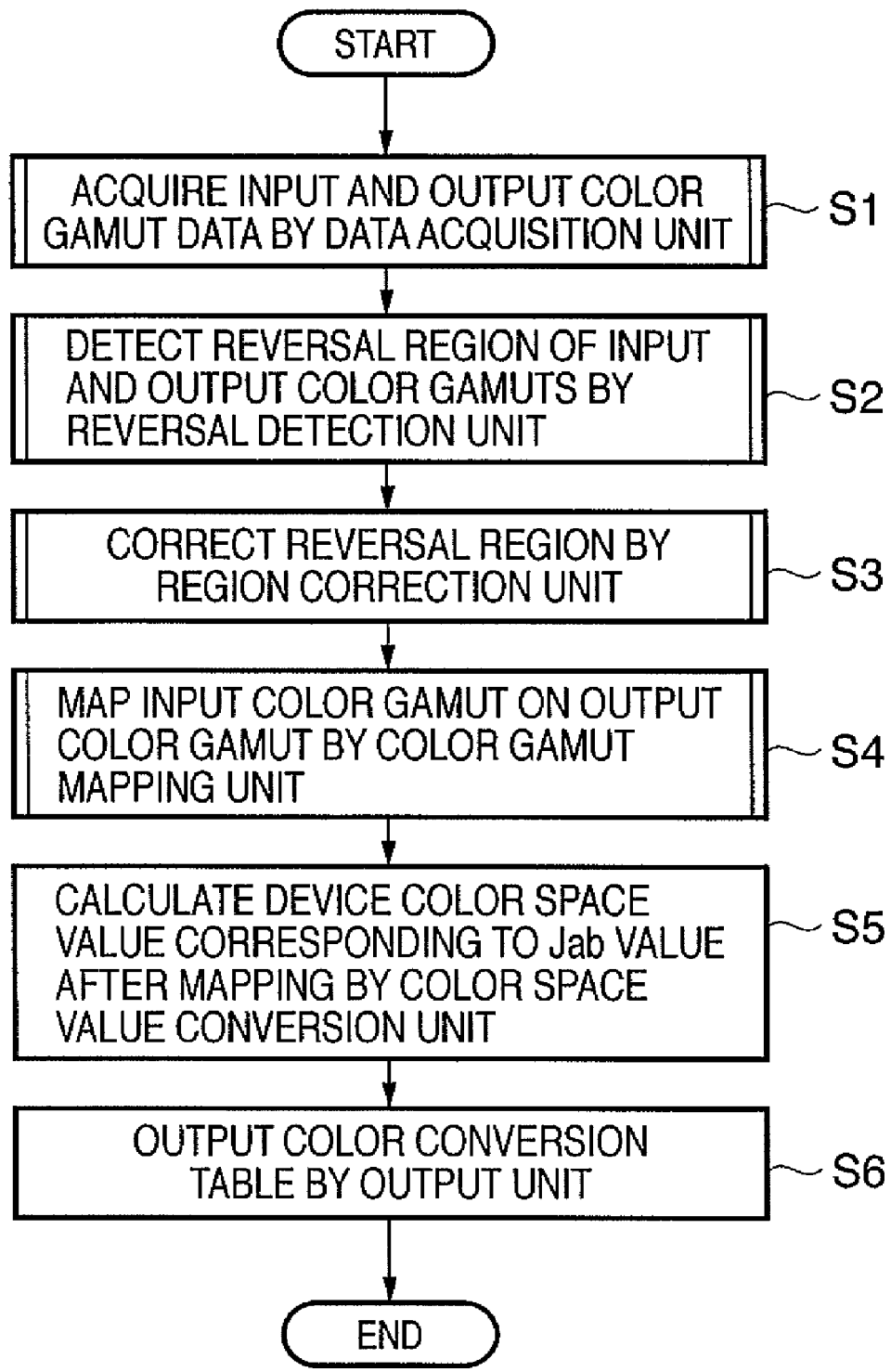
FIG. 2 is a flowchart showing an overview of the processing in the color processing apparatus according to the first embodiment.

The color processing apparatus 1 of this embodiment creates a color conversion table used to convert input color space values (RGB) into output color space values (Jab). The processing in the color processing apparatus 1 will be described below with reference to FIG. 2. FIG. 2 is a flowchart showing the color conversion table creation processing in the color processing apparatus 1.

In step S1, the data acquisition unit 101 acquires input and output color gamuts held in the color gamut data holding unit 107, and saves them in the buffer memory 108.

Note that the color gamut data are presented as a correspondence table which describes pairs of color signal values of a device and corresponding perceived color space values, as shown in, e.g., FIG. 3. For example, the color gamut data of a printer are created as follows. Color signal values R, G, and B of the printer are divided into a plurality of slices such as five slices, nine slices, or the like, and the RGB values at grid points of respective slices are input to the printer, thus printing a color sample on a predetermined paper sheet. The print color sample is measured by a calorimeter to obtain XYZ values, and perceived color space values Jab are calculated from these XYZ values using CIECAM02 conversion formulas. The Jab values calculated in this way and device RGB values are saved as pairs, thus creating the color gamut data. Note that the detailed processing contents in the data acquisition unit 101 will be described later.

In step S2, the reversal detection unit 102 detects hue reversal regions of the input and output color gamuts acquired in step S1. Note that the detailed processing contents in the reversal detection unit 102 will be described later.

In step S3, the region correction unit 103 corrects each hue reversal region detected in step S2. Note that the detailed processing contents in the region correction unit 103 will be described later.

In step S4, the color gamut mapping unit 104 maps the input color gamut after correction in step S3 on the output color gamut after correction. Note that the detailed processing contents in the color gamut mapping unit 104 will be described later.

In step S5, the color space value conversion unit 105 converts the color values after mapping in step S4 into color space values, e.g., RGB values of an output device. Conversion of perceived color space values is implemented using an LUT, conversion matrix, or the like, which represents the relationship between device color space values and CIECAM02 values. When the LUT is used, a known technique such as tetrahedral interpolation, cubic interpolation, or the like is used to convert the color values.

In step S6, the output unit 106 outputs the RGB values of the input color gamut data acquired in step S1 and the color space values converted in step S5 in the form of a color conversion table.

Operation in Data Acquisition Unit 101

Figure 4:
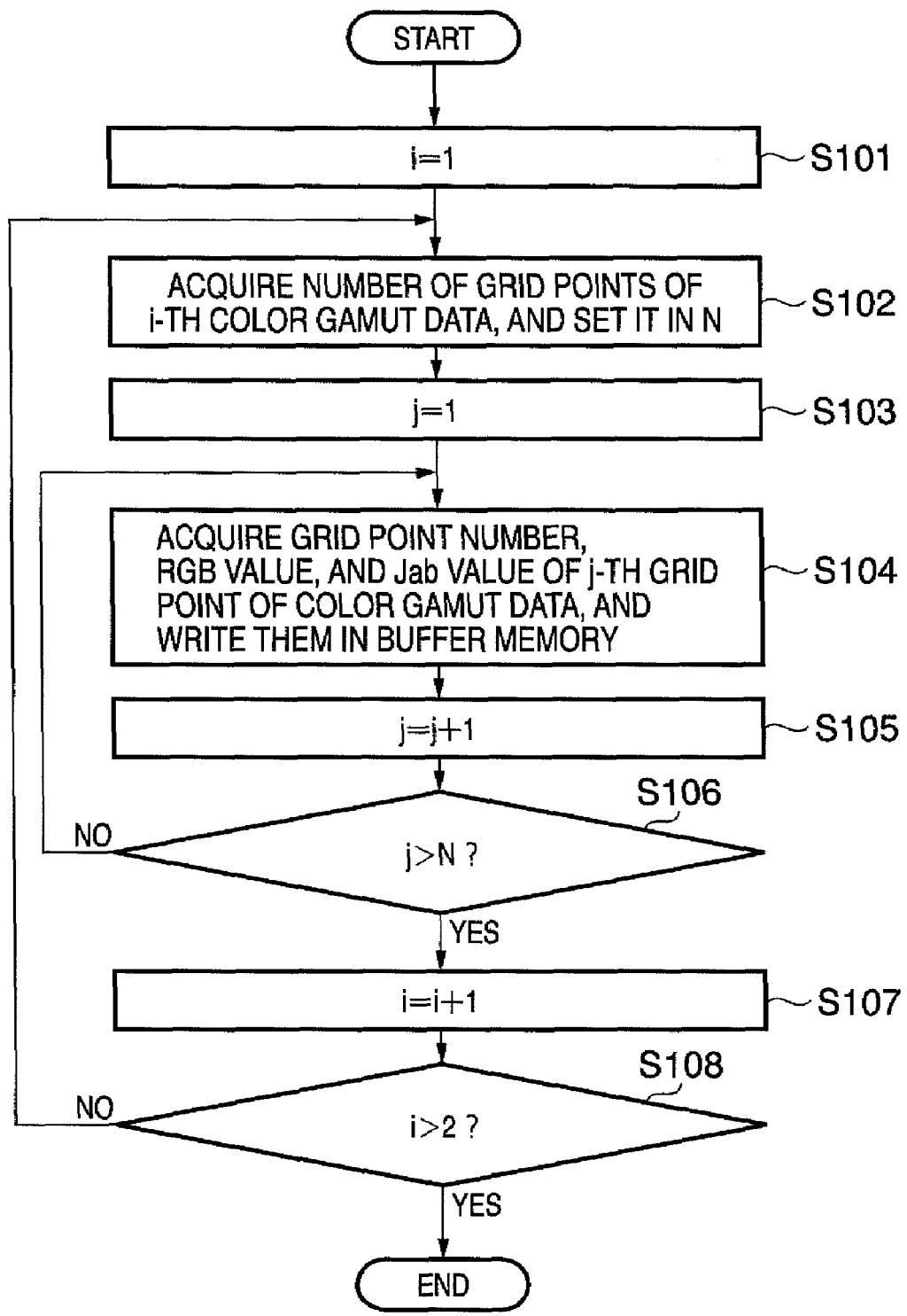
FIG. 4 is a flowchart showing data acquisition processing according to the first embodiment.

The operation in the data acquisition unit 101 in step S1 will be described in detail below with reference to FIG. 4. FIG. 4 is a flowchart showing the data acquisition processing in the data acquisition unit 101.

In step S101, the data acquisition unit 101 substitutes an initial value "1" in a counter i indicating either input or output color gamut data to initialize it. In step S102, the unit 101 loads the grid point number of the lowermost row of i-th color gamut data held in the color gamut data holding unit 107, and sets it in an N number of grid points of the i-th color gamut. In step S103, the unit 101 substitutes an initial value "1" in a counter j indicating a grid point to initialize it. In step S104, the unit 101 loads the grid point number, RGB value, and Jab value of the j-th grid point of the color gamut data held in the color gamut data holding unit 107, and writes them in the buffer memory 108. In step S105, the unit 101 increments the counter j by 1. The unit 101 checks in step S106 if all the grid point numbers, RGB values, and Jab values have been acquired. The unit 101 uses the N number of grid points in this checking process. If the value of the counter j is equal to or smaller than N, i.e., if all the color gamut data have not been acquired yet, the process returns to step S104; if the value of the counter j exceeds N, i.e., if all the color gamut data have been acquired, the process advances to step S107.

The data acquisition unit 101 increments the counter i by 1 in step S107, and checks in step S108 if the color gamut data of the input and output color gamuts have been acquired. If the value of the counter i is equal to or smaller than 2, i.e., if the color gamut data have not been acquired yet, the process returns to step S102 to acquire the next color gamut data. On the other hand, if the value of the counter i exceeds 2, i.e., if the color gamut data of both the input and output gamuts have been acquired, the processing in the data acquisition unit 101 ends.

With the above processing, the data acquisition unit 101 acquires the input and output color gamut data.

Operation in Reversal Detection Unit 102

Figure 5A:
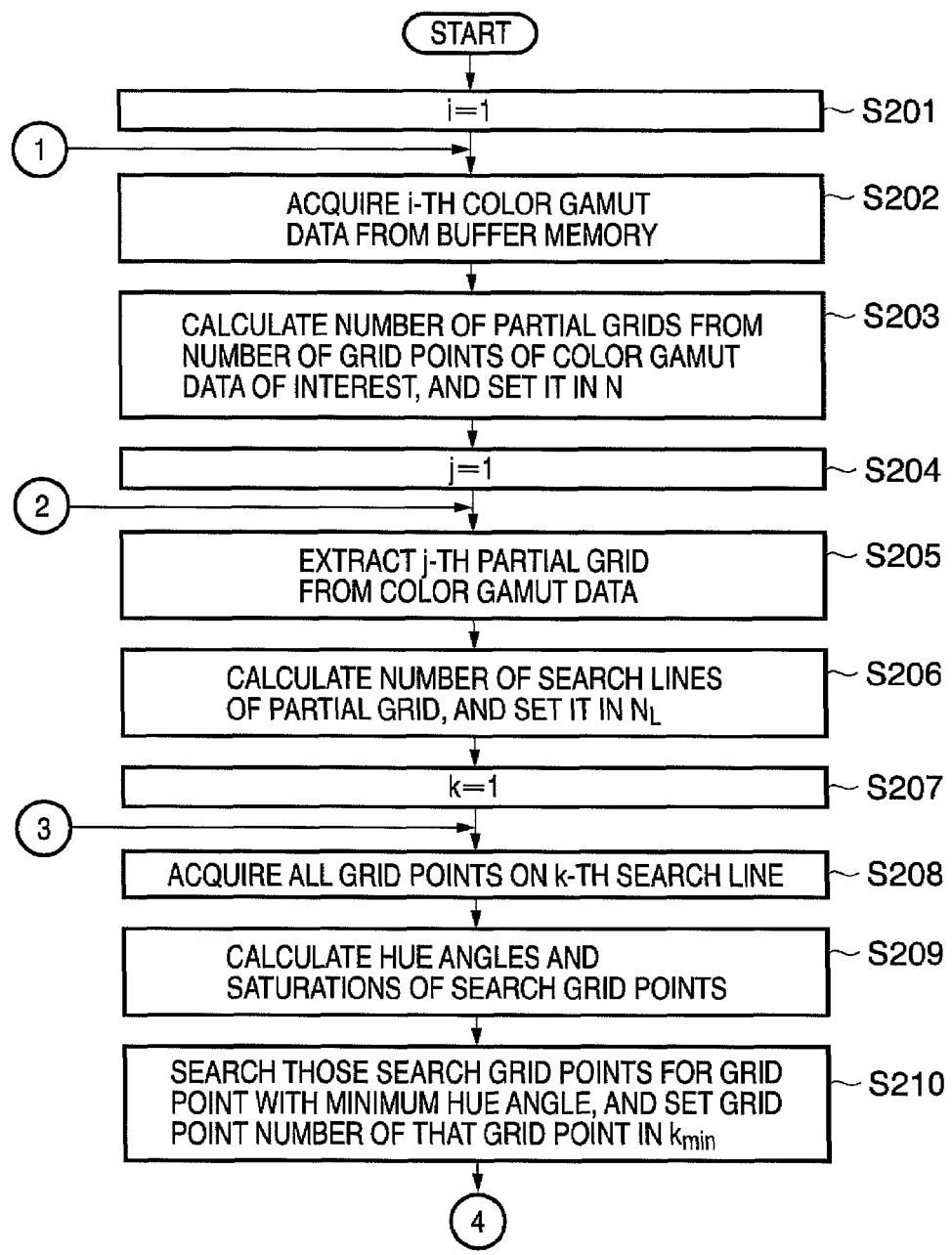
FIGS. 5A and 5B are flowcharts each showing reversal detection processing according to the first embodiment.
Figure 5B:
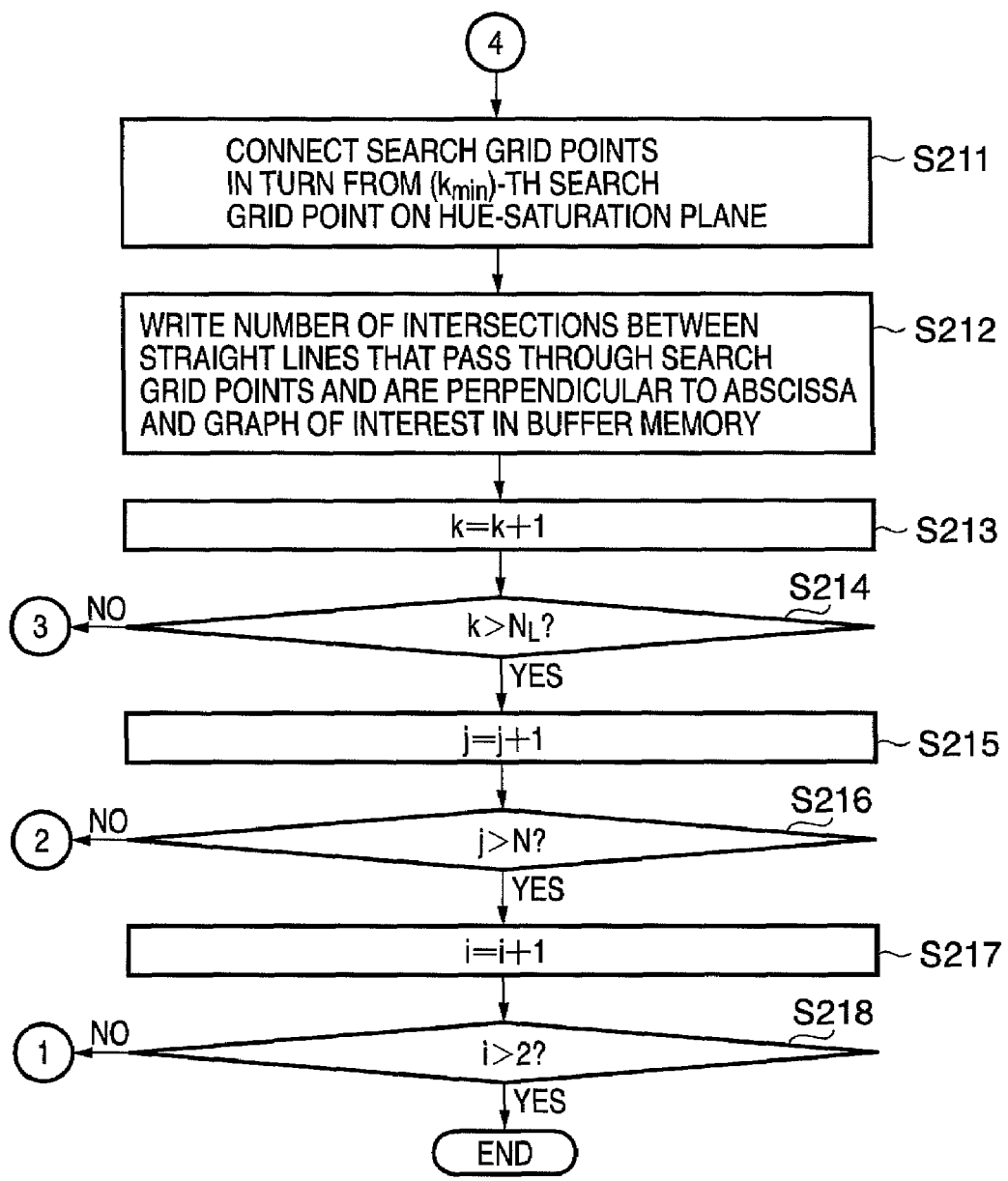

The operation in the reversal detection unit 102 in step S2 will be described in detail below with reference to FIGS. 5A and 5B. FIGS. 5A and 5B are flowcharts each showing the reversal detection processing in the reversal detection unit 102.

In step S201, the reversal detection unit 102 substitutes an initial value "1" in a counter i to initialize it. In step S202, the unit 102 acquires the color gamut data (the grid point numbers, RGB values, and Jab values of all the grid points) of the i-th color gamut from the buffer memory 108. In step S203, the unit 102 calculates the number of partial grids (to be described in detail later) from the number of grid points of the color gamut data acquired in step S202, and sets it in N.

In this embodiment, upon detecting a reversal region and upon correcting that region, RGB grids are divided into a nest, and the processing is done for each grid. In general, nesting indicates a state wherein in a box-shaped container, smaller containers are fit in turn. Therefore, the interior of each individual box must be hollow. In this embodiment, a grid point exists inside each individual grid. Each individual grid will be referred to as a partial grid hereinafter.

Figure 6:
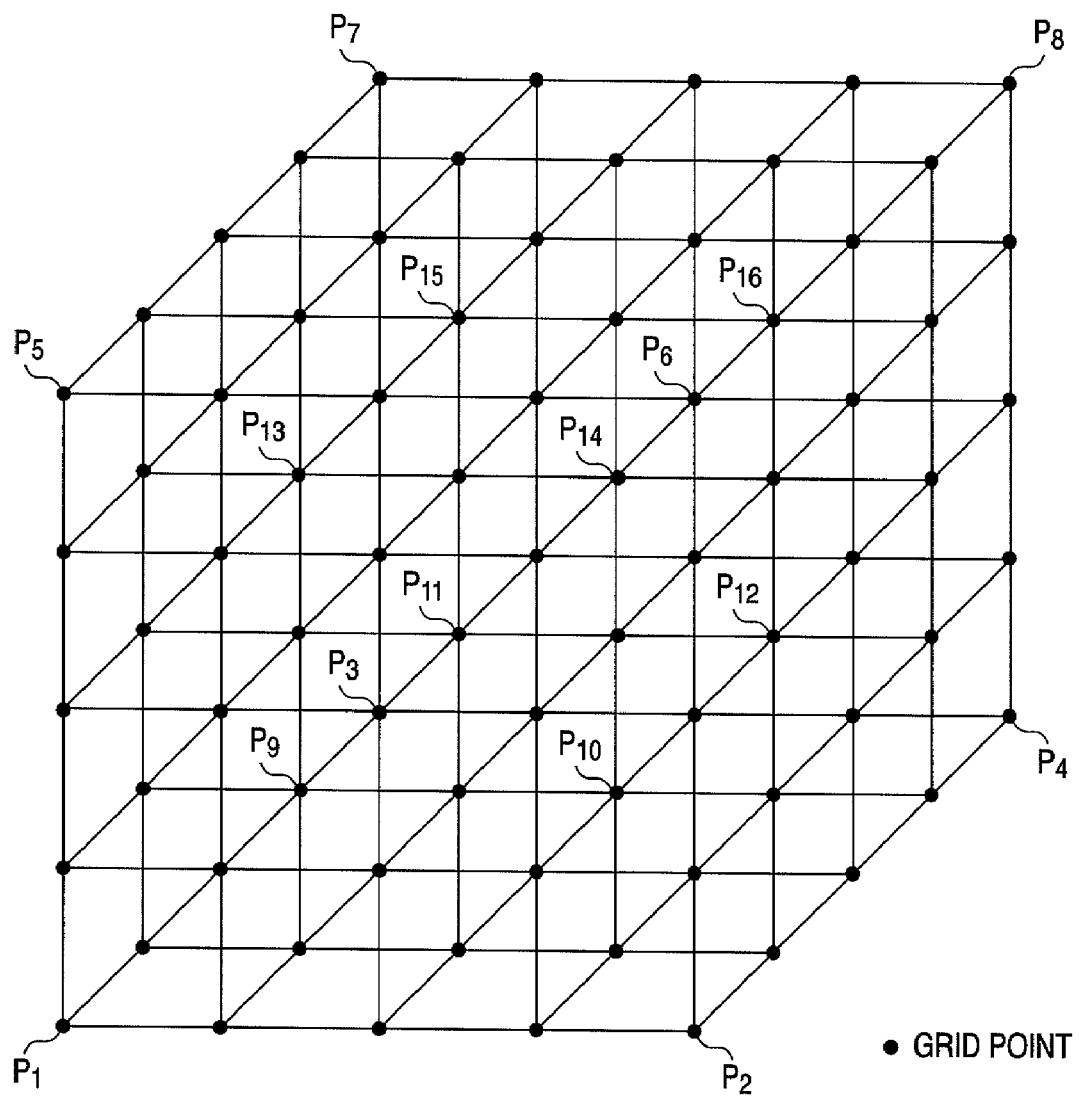
FIG. 6 shows an example of partial grids according to the first embodiment.

FIG. 6 shows an example of partial grids in this embodiment. Referring to FIG. 6, ★ marks indicate grid points, and a first partial grid is configured by all grid points included in a hexagon which has, as vertices, grid points P1, P2, P3, P4, P5, P6, P7, and P8. Also, a second partial grid is configured by all grid points included in a hexagon which has, as vertices, grid points P9, P10, P11, P12, P13, P14, P15, and P16. In case of five slice grids as shown in FIG. 6, the first partial grid includes all 125 grid points, and the second partial grid includes 27 grid points nested inside the first partial grid. In general, in case of N slice grids, if the step size of each slice is N steps, a value V that R, G, and B values of a grid point of the j-th partial grid can assume can be expressed by:

$$V = \min(N_{step} \times (x-1), 255) \quad (1)$$

where min(a, b) is a function that compares a and b, and returns a smaller value. Also, j and x respectively satisfy:

$$j \leq x \leq N(j-1) \quad (2)$$

$$1 \leq j \leq (N-1)/2 \quad (3)$$

Let n be the number of bits of a device RGB value, then the step size $N_{step}$ can be expressed using the number N of slices by:

$$N_{step} = 2^n/(N-1) \quad (4)$$

In general, in case of N slice grids, there are (N−1)/2 partial grids, and the number of grid points of the j-th partial grid can be expressed by $(N-j+1)^3$.

Referring back to FIG. 5A, the reversal detection unit 102 substitutes an initial value "1" in a counter j to initialize it in step S204. In step S205, the unit 102 extracts the j-th partial grid from the color gamut data acquired in step S202. In step S206, the unit 102 calculates the number of search lines (to be described in detail later) included in the partial grid extracted in step S205, and sets it in $N_L$.

Figure 7:
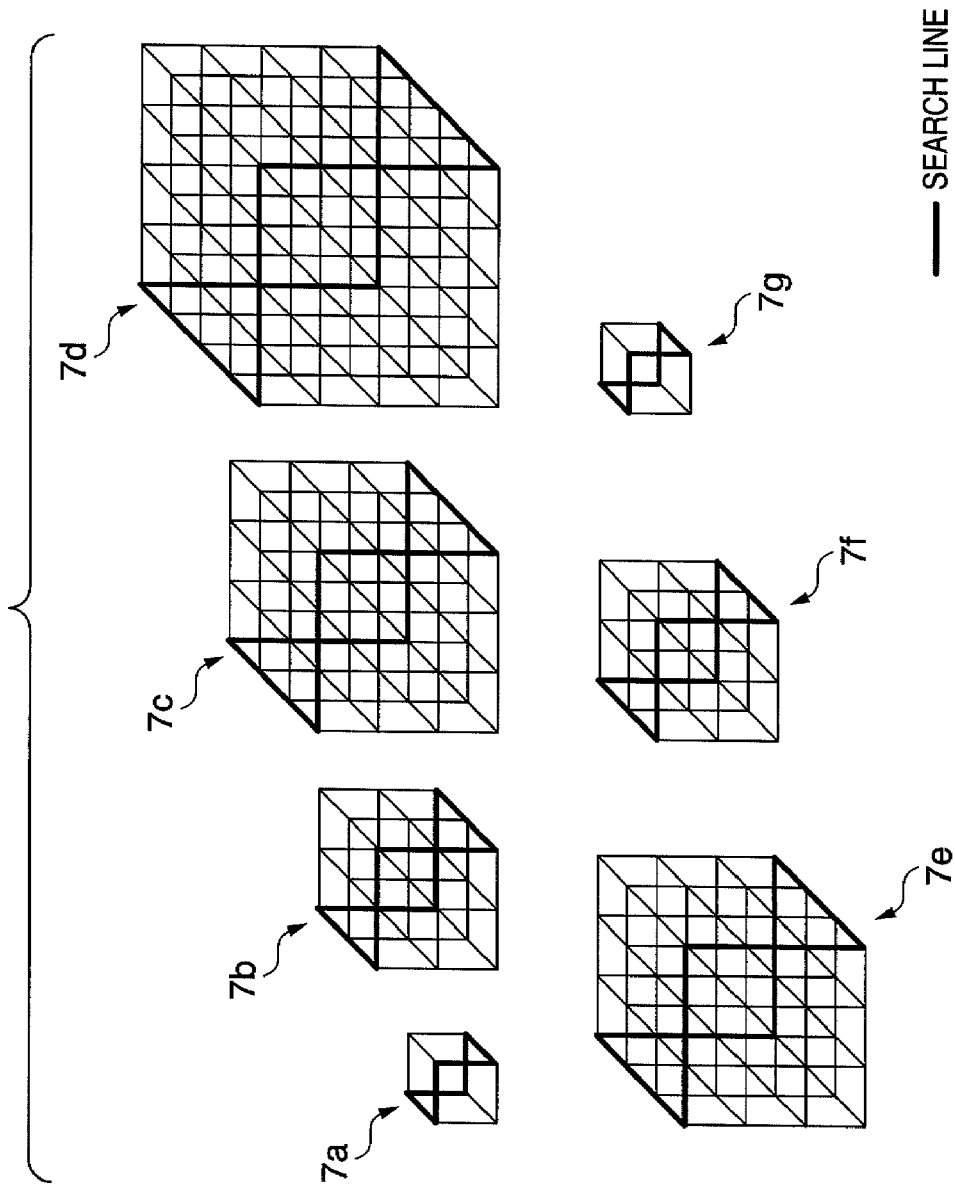
FIG. 7 shows an example of search lines according to the first embodiment.

In this embodiment, upon detection of a hue reversal region of each partial grid, a set is defined by some grid points, and the presence/absence of the hue reversal at each grid point is recorded while searching for grid points included in this set. Grids included in this set will be referred to as search grid points hereinafter. A line formed by connecting the search grid points in a search order will be referred to as a search line hereinafter. FIG. 7 shows an example of search lines. Referring to FIG. 7, grids 7a to 7a are configured by grid points, R, G, and B values of which satisfy:

$$V_i = N_{step} \times j \tag{5}$$

$$\text{If } 1 \leq i \leq N-1, 1 \leq j \leq i+1 \tag{6}$$

$$\text{If } N \leq i \leq 2N-3, i-N+2 \leq j \leq N \tag{7}$$

where $N_{step}$ is the step size of grids expressed by:

$$N_{step} = 2^n / (N-1) \tag{8}$$

where n is the number of bits of the R, G, and B values.

Let $V_{min}$ be a minimum value that the RGB value of a grid point included in each grid can assume, and $V_{max}$ be a maximum value. Then, each search line indicated by the bold line in FIG. 7 is configured by a line segment formed by connecting the following six points in turn. Note that the line returns to point 1 after point 6.

Point 1: $(V_{max}, V_{min}, V_{min})$
Point 2: $(V_{max}, V_{max}, V_{min})$
Point 3: $(V_{min}, V_{max}, V_{min})$
Point 4: $(V_{min}, V_{max}, V_{max})$
Point 5: $(V_{min}, V_{min}, V_{max})$
Point 6: $(V_{max}, V_{min}, V_{max})$ In general, in case of partial grids of N slices, there are 2N−3 search lines described in the above example.

Referring back to FIG. 5A, the reversal detection unit 102 substitutes an initial value "1" in a counter k to initialize it in step S207. In step S208, the unit 102 extracts search grid points on the k-th search line in the search order from the partial grid acquired in step S205, and writes them in the buffer memory 108. In step S209, the unit 102 calculates a hue angle h and saturation C of each search grid point extracted in step S208, and writes them in the buffer memory 108. The hue angle h is calculated using a and b values of that grid point by:

$$h = \tan^{-1} \frac{b}{a} \tag{9}$$

The saturation C is calculated by:

$$C = \sqrt{a^2 + b^2} \tag{10}$$

In step S210, the reversal detection unit 102 sets, in $k_{min}$, the grid point number of a grid point, whose hue angle h calculated in step S209 is smallest, of the search grid points extracted in step S208. In step S211, the unit 102 plots search grid points on a hue-saturation plane in turn from the ($k_{min}$)-th search grid point found in step S210, and connects neighboring search grid points via line segments. The unit 102 checks in step S212 based on the graph created in step S211 if the hues of respective search grid points are reversed.

Figure 8:
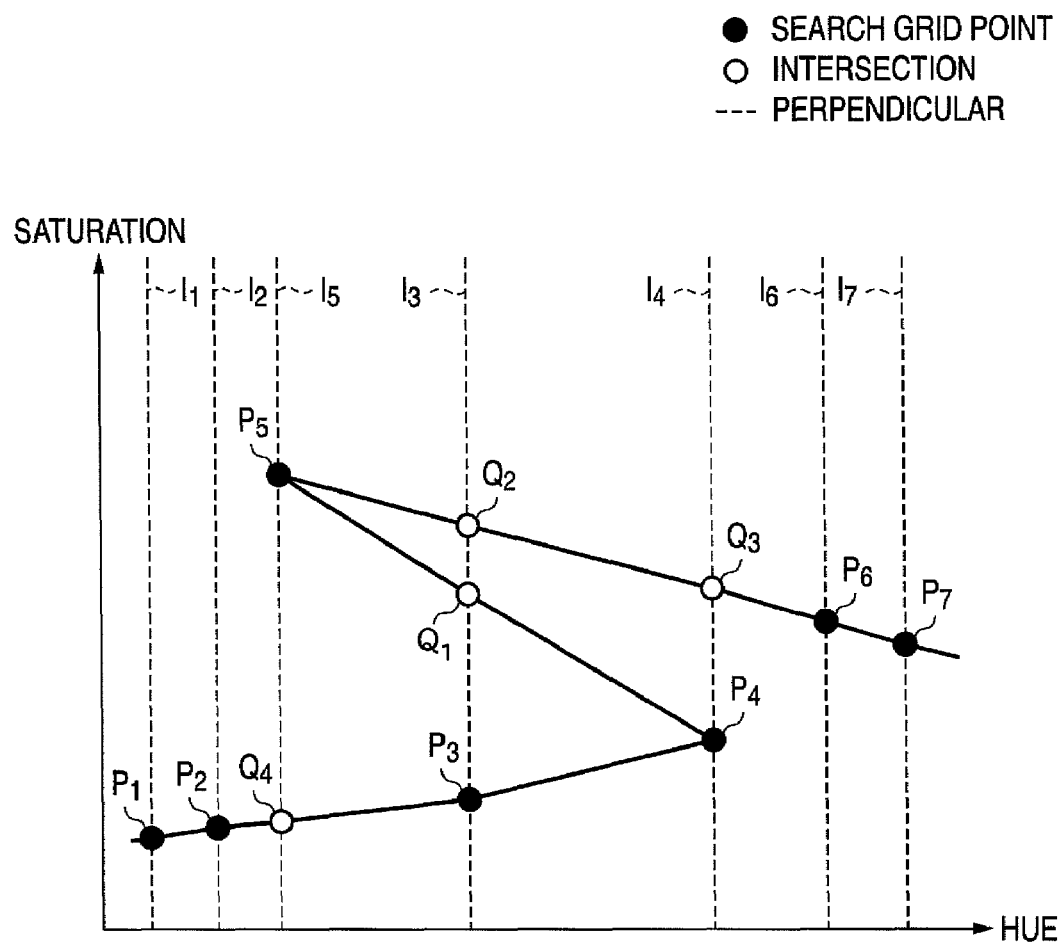
FIG. 8 shows an example of search grid points on a hue-saturation plane according to the first embodiment.

The hue reversal detection method in this embodiment will be described below using the hue-saturation plane shown in FIG. 8. In FIG. 8, the abscissa plots the hue, and the ordinate plots the saturation. Points P1 to P7 represent some search grid points on a search line. Straight lines which pass through respective search grids and are perpendicular to the hue axis are defined, and intersections between the straight lines and a graph that connects the search grid points are obtained, thus calculating the number of intersections. The obtained intersections are indicated by points Q1 to Q4 shown in FIG. 8. For example, the points Q1 and Q2 are intersections between a perpendicular $I_3$ that passes through the point P3, and the graph. Therefore, the number of intersections between the perpendicular $I_3$ and graph is a total of three including the search grid point P3 in addition to the points Q0 and Q2. In this way, the number of intersections between the perpendicular that passes through each search grid point and the graph is calculated, and is written in the buffer memory 108 in association with each search grid point number. FIG. 9 shows an example of an intersection number correspondence table showing the correspondence between the grid point numbers and the numbers of intersections. As shown in FIG. 9, the grid point numbers are written in the first column, and the corresponding numbers of intersections are written in the second column. When the number of intersections is 2 or more, it represents that the hues of the search grid point of interest and other search grid points are reversed. Hence, the hue reversal at each grid point can be detected from the number of intersections correspondence table.

Referring back to FIG. 5B, the reversal detection unit 102 increments the counter k by 1 in step S213. The unit 102 checks in step S214 if the processing for all the search lines in the partial grid is complete. This checking process uses $N_L$ set in step S206. If the value of the counter k is less than $N_L$, i.e., if the processing for all the search lines is not complete yet, the process returns to step S208. If the value of the counter k exceeds $N_L$, i.e., if the processing for all the search lines is complete, the process advances to step S215.

The reversal detection unit 102 increments the counter j by 1 in step S215, and checks in step S216 if the processing for all the partial grids is complete. This checking process uses N set in step S203. If the value of the counter j is less than N, i.e., if the processing for all the partial grids is not complete yet, the process returns to step S205. On the other hand, if the value of the counter j exceeds N, i.e., if the processing for all the partial grids is complete, the process advances to step S217.

The reversal detection unit 102 increments the counter i by 1 in step S217, and checks in step S218 if the processing for all the color gamuts is complete. Since the color gamuts in this embodiment include two color gamuts, i.e., input and output color gamuts, this checking process is implemented by comparing the value of the counter i by the number of color gamuts=2. If the value of the counter i is less than 2, i.e., if the processing for both the input and output color gamuts is not complete yet, the process returns to step S202. On the other hand, if the value of the counter i exceeds 2, i.e., if the processing for both the input and output color gamuts is complete, the processing in step S2 ends.

As described above, the reversal detection unit 102 detects the hue reversal of respective grid points based on the number of intersections between line segments that connect the search grid points on the hue-saturation plane and the perpendicular that passes through each search grid point. This is the detection method that uses that two or more intersections at the grid point of interest appear when the positional relationship of grid points is reversed.

Since the hue reversal detection processing is applied not only to the color gamut surface but also grid points inside the color gamut, the hue reversal of grid points inside the color gamut can also be detected. Note that a target region which is to undergo the hue reversal detection processing (e.g., whether or not the processing is applied even to grid points inside the color gamut) is determined depending on the algorithm of color gamut mapping.

Since the hue reversal detection processing is applied to grid points, even a slight hue reversal of the color gamut can also be detected. This is the detection method which uses that all the hue reversals of the color gamut can be detected by inspecting the presence/absence of hue reversal for each grid point, since the color gamut is configured by grid points, and the grid points serve as singular points of the color gamut at the same time.

Since the detection processing is applied to only grid points, the hue reversals can be detected at a minimum required search cost. Hence, the hue reversals can be detected at higher speed than, e.g., a method of searching hues in increments of 1°.

Operation in Region Correction Unit 103

The operation in the region correction unit 103 in step S3 will be described in detail below with reference to FIGS. 10A and 10B. FIGS. 10A and 10B are flowcharts each showing the region correction processing in the region correction unit 103.

The region correction unit 103 loads the color gamut data from the buffer memory 108, extracts partial grids from the color gamut data, and then acquires grid points on search lines included in each partial grid in the processes in steps S301 to S308. Since these processes are the same as those in steps S201 to S208 shown in FIG. 5A in the reversal detection unit 102, a detailed description thereof will not be given.

In steps S313 to S318, the region correction unit 103 executes the checking process of completion of the processing for all search lines in each partial grid, that of completion of processing for all partial grids, and that of completion of processing for all color gamuts. Since these processes are also the same as those in steps S213 to S218 shown in FIG. 5B in the reversal detection unit 102, a detailed description thereof will not be given. The processes in steps S309 to S312, which are different from those of the reversal detection unit 102, will be described below.

In step S309, the region correction unit 103 acquires the number of intersections correspondence table (FIG. 9) which is written in the buffer memory 108 in step S212 in FIG. 5B described above. In step S310, the unit 103 acquires the grid point numbers of search grid points which are located at the boundary of the hue reversal region based on the number of intersections correspondence table. As can be understood from the number of intersections correspondence table shown in FIG. 9, since the search grid points with two or more intersections are those of grid point numbers 3 to 5, these search grid points form the hue reversal region. Search grid points which neighbor the hue reversal region will be referred to as boundary grid points hereinafter. In case of FIG. 9, search grid points of grid point numbers 2 and 6 become boundary grid points. These two search grid points are paired and saved in the buffer memory 108.

In step S311, the region correction unit 103 calculates inter-grid point distances for the search grid points of the hue reversal region sandwiched between the boundary grid points acquired in step S310, and writes them in the buffer memory 108. If i is a natural number, an inter-grid point distance $d_i$ between the i-th search grid point and (i+1)-th search grid point is calculated by:

$$d_i = \sqrt{(J_i - J_{i+1})^2 + (a_i - a_{i+1})^2 + (b_i - b_{i+1})^2} \quad (11)$$

where $J_i$, $a_i$, and $b_i$ are the J, a, and b values of the i-th search grid point.

Figure 11:
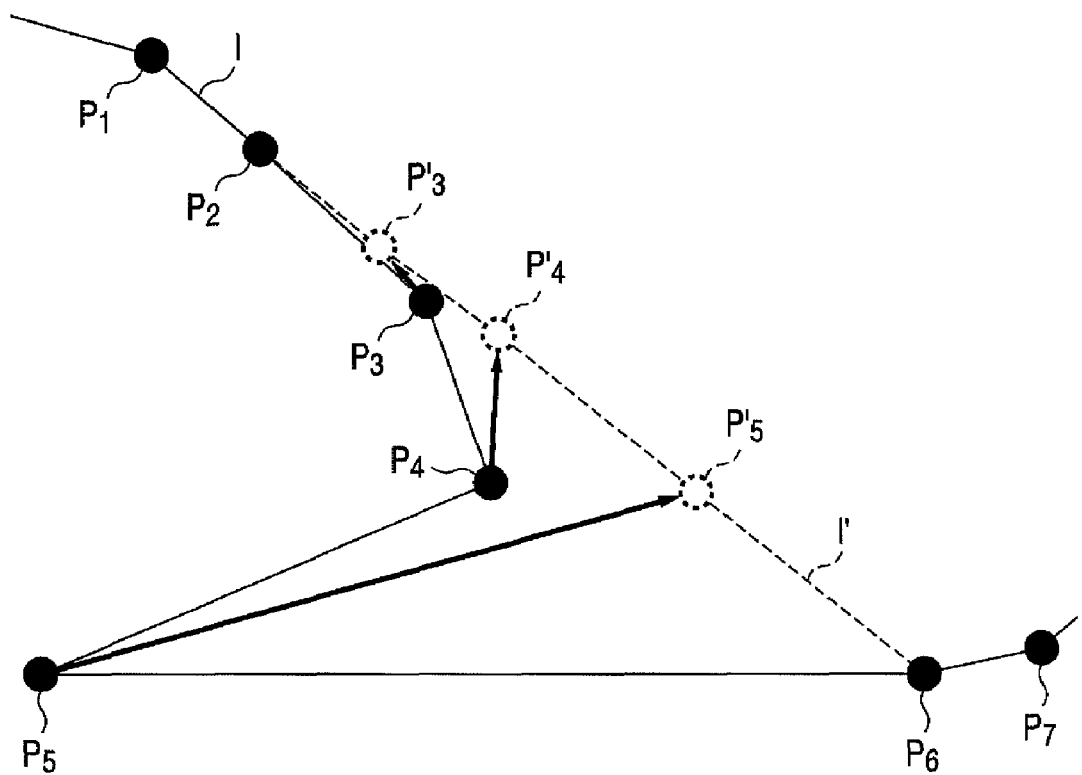
FIG. 11 shows an example of shifts of hue reversal grid points according to the first embodiment.

In step S312, the region correction unit 103 shifts the search grid points of the hue reversal region in accordance with the ratio of the inter-grid point distances calculated in step S311. In this embodiment, the unit 103 shifts the hue reversal grid points to points that internally divide the pair of boundary grid points at the ratio of the inter-grid distances of the hue reversal grid points. FIG. 11 shows a shift example of the hue reversal grid points. FIG. 11 shows the search grid points and shifted points on the a-b plane. Let P1 to P7 be the search grid points, and P'3 to P'5 be points after shifts of the search grid points. Also, let s be one grid point number of the boundary grid points, and e be the other grid point number. Then, the point after shift can be described by:

$$\overrightarrow{OP'_i} = \frac{n_i}{m_i + n_i}\overrightarrow{OP'_s} + \frac{m_i}{m_i + n_i}\overrightarrow{OP'_e} \quad (12)$$

where O represents the origin of the a-b plane.

At this time, $m_i$ and $n_i$ can be respectively expressed by:

$$m_i = \sum_{j=s}^{i-1} |\overrightarrow{P_j P_{j+1}}| \quad (13)$$

$$n_i = \sum_{j=i}^{e-1} |\overrightarrow{P_j P_{j+1}}| \quad (14)$$

The region correction unit 103 rewrites the Jab values of the hue reversal grid points of the color gamut data by those after shift calculated using equation (12) above. With the above processing, the hue reversal region of the color gamut can be corrected.

As described above, the region correction unit 103 corrects the hue reversals of the color gamut by holding the ratio of the inter-grid point distances of the hue reversal region, and shifting the hue reversal grid points to points between the boundary grid points at the two ends, which sandwich the hue reversal region.

Operation in Color Gamut Mapping Unit 104

Figure 12A:
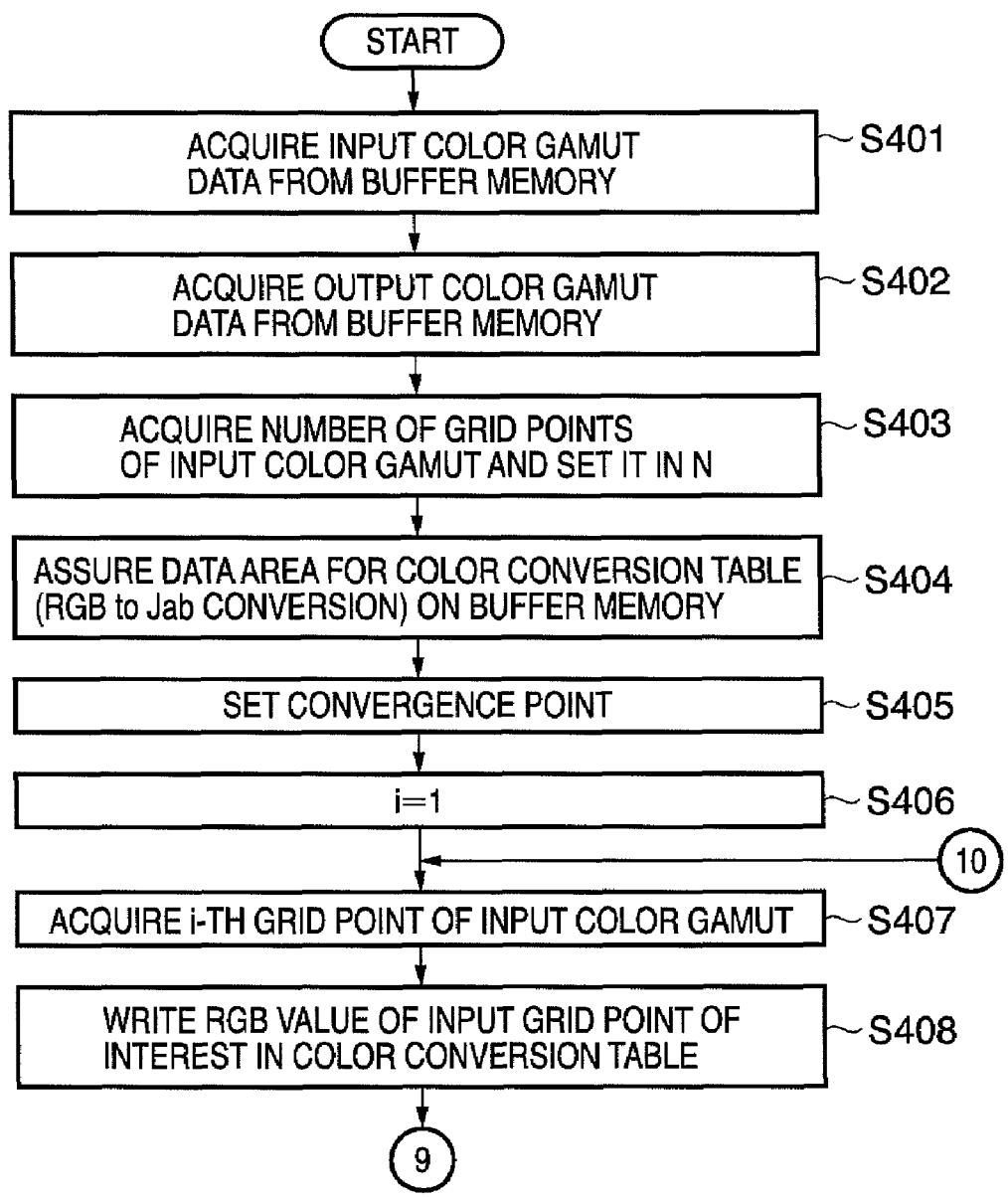
FIGS. 12A and 12B are flowcharts each showing color gamut mapping processing according to the first embodiment.
Figure 12B:
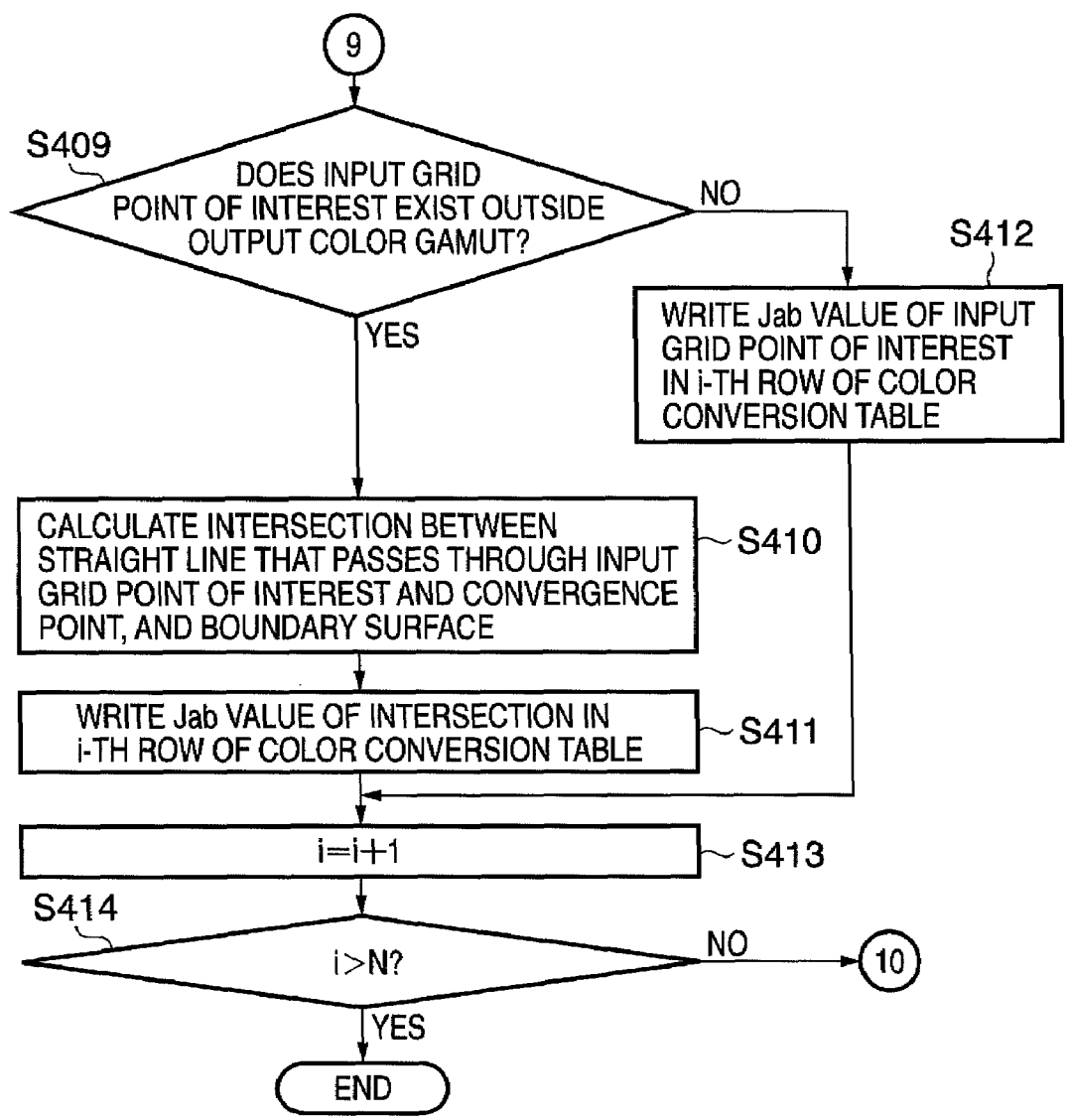

The operation in the color gamut mapping unit 104 in step S4 will be described in detail below with reference to FIGS. 12A and 12B. FIGS. 12A and 12B are flowcharts each showing the color gamut mapping processing in the color gamut mapping unit 104 of this embodiment.

The color gamut mapping unit 104 acquires the input and output color gamut data corrected in step S312 in FIG. 103 above from the buffer memory 108 in steps S401 and S402. In step S403, the unit 104 acquires the number of grid points from the input color gamut data acquired in step S401, and sets it in N. In step S404, the unit 104 assures a data area for a color conversion table on the buffer memory 108. This color conversion table is required to hold the correspondence between the color space values R, G, and B of an input device, and the J, a, and b values after the J, a, and b values corresponding to the color space values are mapped on the output color gamut.

Figure 13:
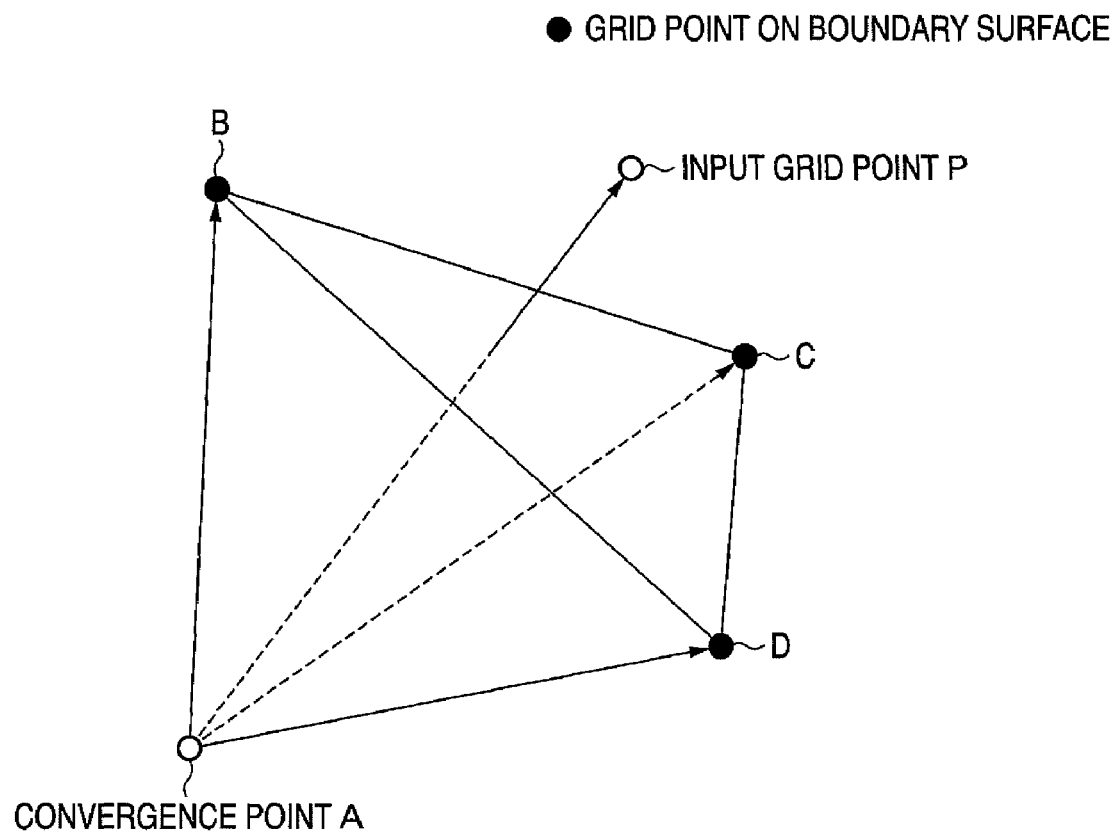
FIG. 13 shows an example of inside/outside determination of a color gamut according to the first embodiment.

In step S405, the color gamut mapping unit 104 sets a point in the output color gamut, e.g., (50, 0, 0), as a convergence point. In step S406, the unit 104 substitutes an initial value "1" in a counter i to initialize it. The unit 104 acquires the i-th grid point of the input color gamut in step S407, and writes the RGB value of that input grid point in the color conversion table, which is assured in step S404, in step S408. The unit 104 checks in step S409 if the input grid point exists outside the output color gamut. This color gamut inside/outside determination is made based on the positional relationship of an intersection between a triangle which configures the boundary surface, and a straight line that connects the input grid point and convergence point. FIG. 13 shows an example of the color gamut inside/outside determination in this embodiment. As shown in FIG. 13, let B, C, and D be the vertices of a triangle configured by the grid points of the boundary surface, A be the convergence point set in step S405, and P be the input grid point. Then, a point on a straight line AP is expressed by:

$$\vec{AP} = s\vec{AB} + t\vec{AC} + u\vec{AD} \qquad (15)$$

If the J, a, and b values of a point X are expressed by $(J_x, a_x, b_x)$, s, t, and u are calculated by:

$$\begin{pmatrix} s \\ t \\ u \end{pmatrix} = \begin{pmatrix} J_B - J_A & J_C - J_A & J_P - J_A \\ a_B - a_A & a_C - a_A & a_P - a_A \\ b_B - b_A & b_C - b_A & b_P - b_A \end{pmatrix}^{-1} \begin{pmatrix} J_P - J_A \\ a_P - a_A \\ b_P - b_A \end{pmatrix} \qquad (16)$$

At this time, if a point P exists inside a tetrahedral ABCD, $$s+t+u \leq 1 \qquad (17)$$

$$0 \leq s, 0 \leq t, 0 \leq u \qquad (18)$$

hold.

If relations (17) and (18) hold, the color gamut mapping unit 104 determines that the input grid point exists inside the output color gamut, and the process advances to step S412. On the other hand, if inequalities (17) and (18) do not hold, the unit 104 determines that the input grid point exists outside the output color gamut, and the process advances to step S410.

In step S410, the color gamut mapping unit 104 calculates an intersection between a straight line that passes through the input grid point and the convergence point, and the boundary surface. In step S411, the unit 104 writes the Jab value of the intersection calculated in step S410 in the i-th row of the color conversion table assured in step S404.

In step S412, the color gamut mapping unit 104 writes the Jab value of the input grid point acquired in step S407 in the i-th row of the color conversion table assured in step S404.

The color gamut mapping unit 104 increments the counter i by 1 in step S413, and checks in step S414 if the processing for all grid points of the input color gamut is complete. This checking process uses N set in step S403. If the value of the counter i is less than N, i.e., the processing for all grid points is not complete yet, the process returns to step S407. On the other hand, if the value of the counter i exceeds N, i.e., if the processing for all grid points is complete, the processing in step S4 ends.

As described above, the color gamut mapping unit 104 preserves the color value of each input grid point within the output color gamut. On the other hand, the unit 104 pastes the input grid point outside the output color gamut to an intersection between a line segment that connects the input grid point and convergence point, and the boundary surface, thus mapping the input color gamut onto the output color gamut.

In this embodiment, data required as the output color gamut data are those on the boundary surface. Therefore, the reversal detection unit 102 may detect the reversal from the boundary surface for the output color gamut.

Effects of This Embodiment

As described above, according to this embodiment, the color gamut of an input device can be automatically mapped onto that of an output device upon creating the color conversion table required to convert input color space values into output color space values. Furthermore, grids that configure the color gamut are divided into partial grids, neighboring grid points on the hue-saturation plane are connected via line segments for respective search lines of each partial grid, and the number of intersections between straight lines which pass through the respective grid points and are perpendicular to the hue axis, and the line segments is calculated, thus detecting grid points which suffer the hue reversal. Upon detection of the hue reversal hue reversal grid points are shifted onto a straight line that connects the boundary grid points which sandwiches the hue reversal grid points while maintaining the ratio of the inter-grid point distances of the hue reversal grid points unchanged, thereby allowing mapping which can prevent any hue reversal.

Second Embodiment

The second embodiment according to the present invention will be described below. The second embodiment is characterized in that a user's confirmation operation is made upon creating the color conversion table required to convert input dolor space values into output color space values. The second embodiment detects the hue reversal on the color gamut using a technique different from the first embodiment as the detection method.

Figure 14:
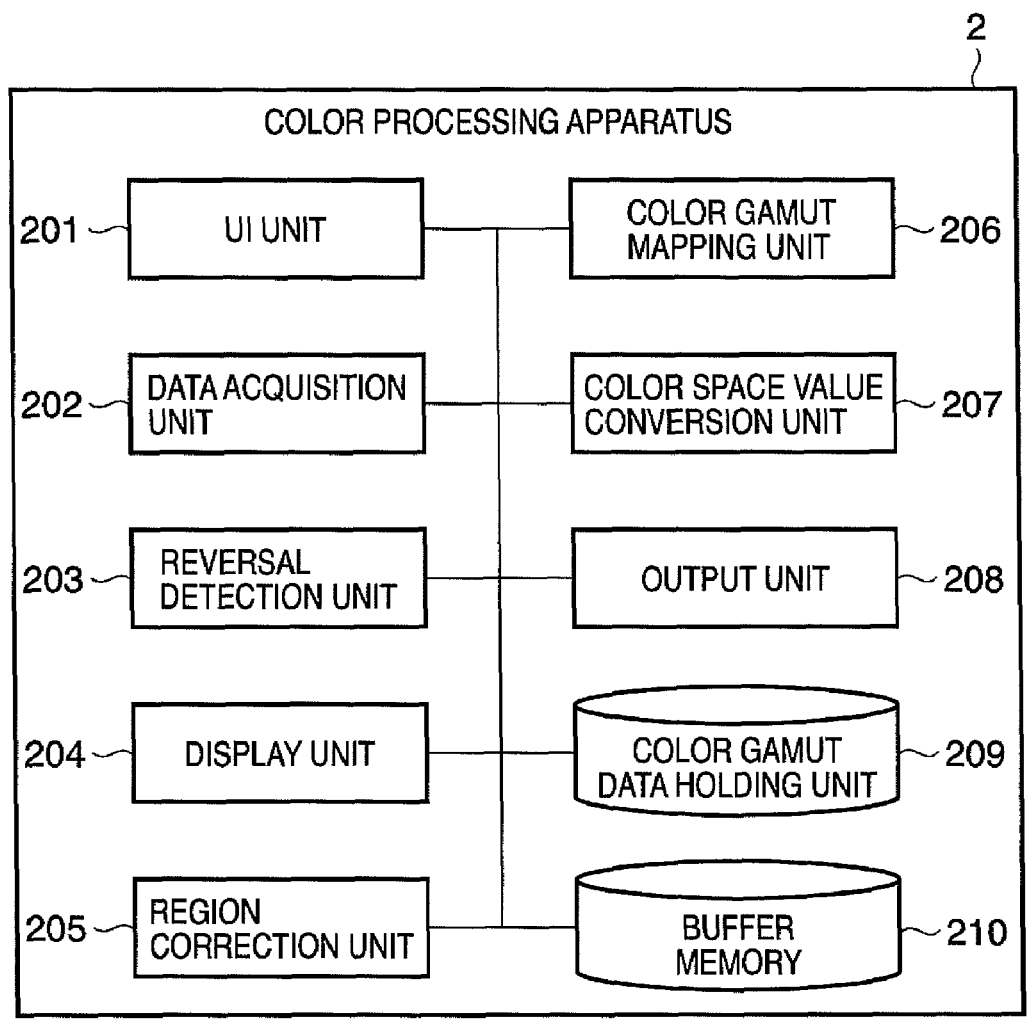
FIG. 14 is a block diagram showing the arrangement of a color processing apparatus according to the second embodiment.

FIG. 14 is a block diagram showing the hardware arrangement that implements a color processing apparatus according to the second embodiment. In a color processing apparatus 2 shown in FIG. 14, reference numeral 201 denotes a UI (user interface) unit which accepts user's inputs; 202, a data acquisition unit which acquires color gamut data; and 203, a reversal detection unit which detects a hue reversal region of the color gamut acquired by the data acquisition unit. Reference numeral 204 denotes a display unit which displays a message that prompts the user to select whether or not to correct the reversal region detected by the reversal detection unit 203. Reference numeral 205 denotes a region correction unit which corrects the reversal region detected by the reversal detection unit 203. Reference numeral 206 denotes a color gamut mapping unit which maps the color gamut corrected by the region correction unit 205; and 207, a color space value conversion unit which converts the color gamut mapped by the color gamut mapping unit 206 into color space values of an output device. Reference numeral 208 denotes an output unit which outputs the color space values converted by the color space value conversion unit 207; 209, a color gamut data holding unit which holds the color gamut data to be loaded by the data acquisition unit 202; and 210, a buffer memory which temporarily holds intermediate data during arithmetic operations.

Processing Overview

Figure 15:
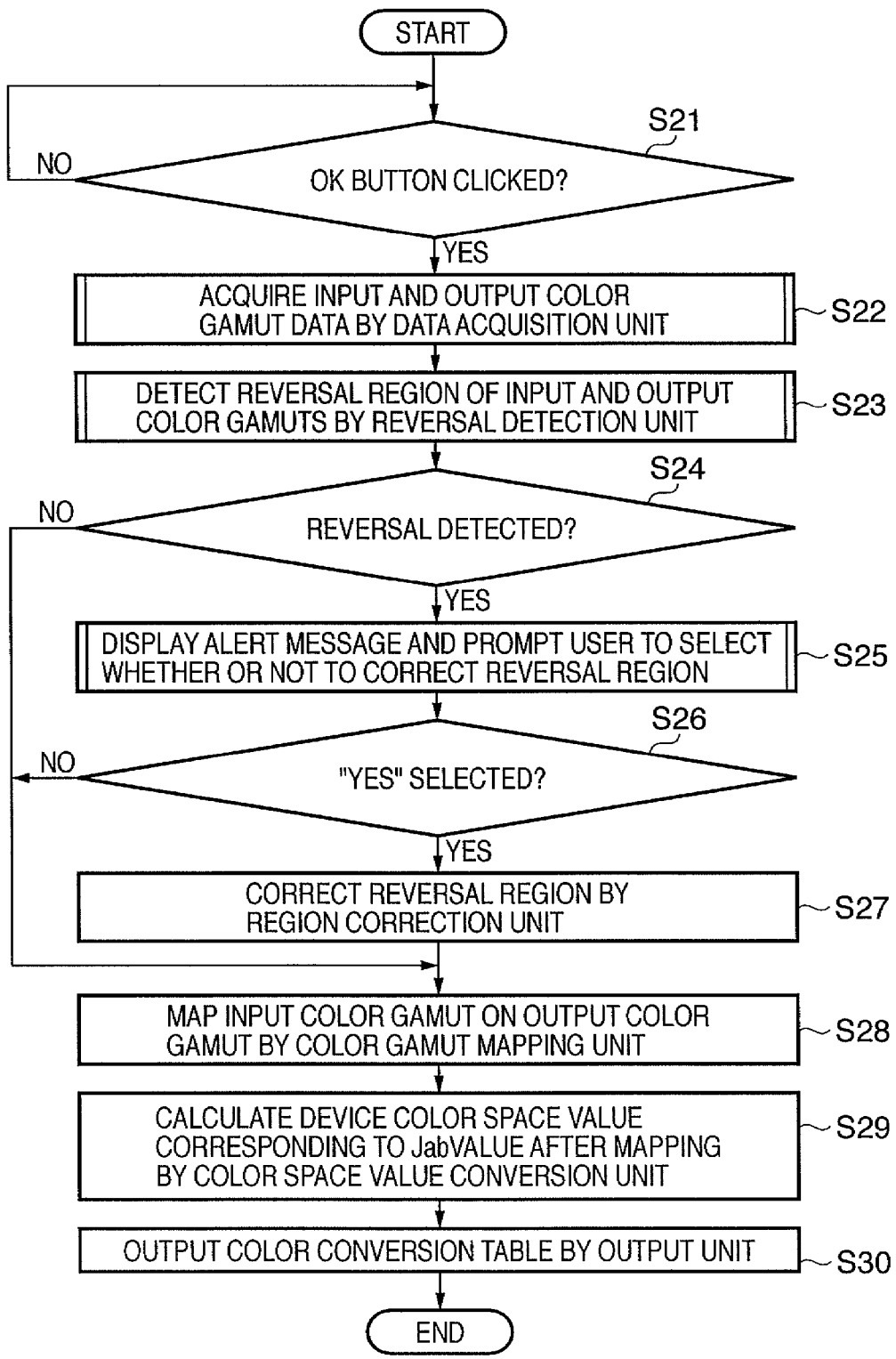
FIG. 15 is a flowchart showing an overview of the processing in the color processing apparatus according to the second embodiment.
Figure 16:
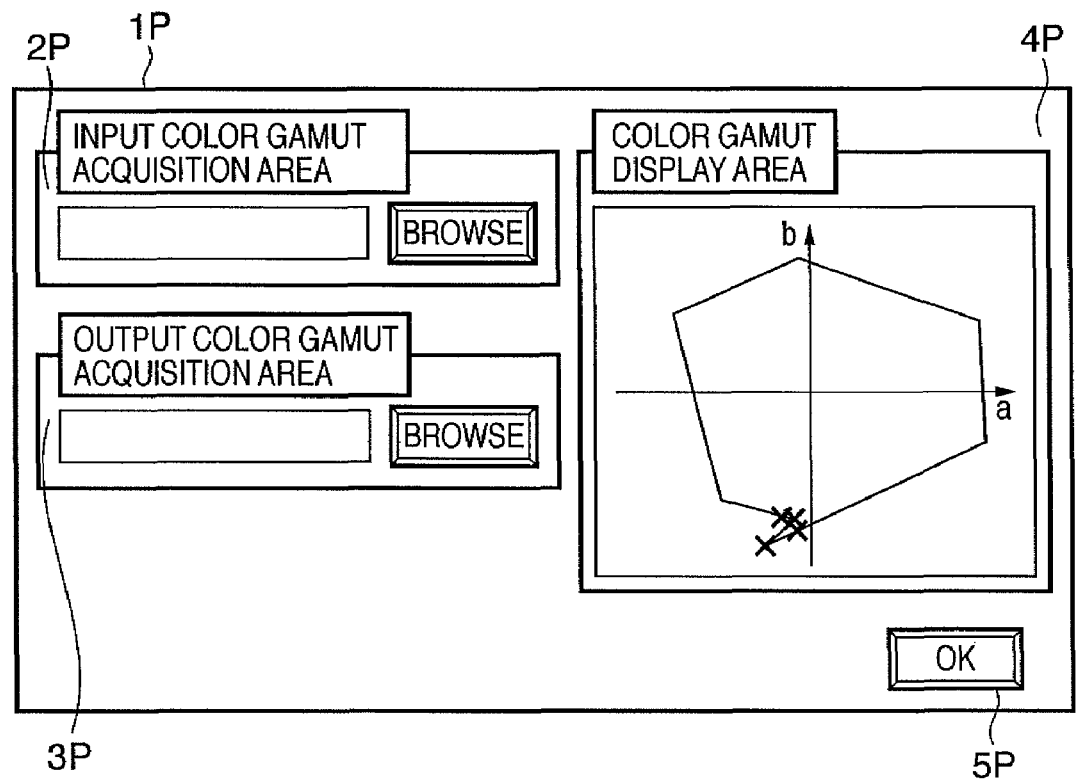
FIG. 16 is shows an example of a UI window according to the second embodiment.

The processing in the color processing apparatus 2 of the second embodiment will be described below with reference to FIGS. 15 and 16. FIG. 15 is a flowchart showing the color conversion table creation processing in the color processing apparatus 2. FIG. 16 shows a display example on the UI unit 201, which implements settings of the color conversion table creation conditions.

The color conversion table of the second embodiment is created based on the color conversion table creation conditions set on a display window shown in FIG. 16. Referring to FIG. 16, reference numeral 1P denotes a UI which serves as a setting window. Reference numeral 2P denotes an input color gamut acquisition area used to acquire input color gamut data; and 3P, an output color gamut acquisition area used to acquire output color gamut data. In this embodiment, assume that input and output color gamut data are acquired by designating the file paths to a memory (e.g., an external storage device) that stores the input and output color gamut data to be processed. Reference numeral 4P denotes a color gamut display area, which displays a color gamut and hue reversal grid points. Reference numeral 5P denotes an OK button which is used to settle various designated data as those to be used in processing upon completion of various inputs.

Upon creation of the color conversion table, the data acquisition unit 202 checks in step S21 (FIG. 15) if the user presses the OK button 5P on the UI unit 201. If the user does not press the OK button 5P, the unit 202 waits for a user's input; otherwise, the process advances to step S22.

In step S22, the data acquisition unit 202 acquires input and output color gamuts held in the color gamut data holding unit 209 based on the conditions of the input and output color gamuts set on the window of FIG. 16, and saves them in the buffer memory 210. Note that the detailed processing contents of the data acquisition unit 202 will be described later.

In step S23, the reversal detection unit 203 detects hue reversal grid points of the input and output color gamuts acquired in step S22. Note that the detailed processing contents of the reversal detection unit 203 will be described later.

The display unit 204 checks in step S24 if the reversal detection unit 203 detects any hue reversal grid points in step S23. The determination method of the presence/absence of the hue reversal will be described later together with the detailed processing contents of the display unit 204. If the unit 203 detects hue reversal grid points, the process advances to step S25; otherwise, the process jumps to step S28.

In step S25, the display unit 204 displays a message indicating that image quality may deteriorate due to the hue reversal, and prompts the user to select whether or not to correct the reversal region, as will be described later.

In step S26, the display unit 204 checks the selection result in step S25, as will be described later. If the user selects correction of the reversal region, the process advances to step S27; otherwise, the process jumps to step S28.

In step S27, the region correction unit 205 corrects the hue reversal region detected in step S23. Note that this correction method is the same as that in step S3 in the first embodiment, and a repetitive description thereof will be avoided.

In step S28, the color gamut mapping unit 206 maps input color values of the input color gamut onto the output color gamut. That is, the input color values to be mapped may or may not be corrected in step S27. Note that this mapping method is the same as that in step S4 in the first embodiment, and a repetitive description thereof will be avoided.

In step S29, the color space value conversion unit 207 converts the color values after mapping in step S28 into color space values of an output device, e.g., RGB values. This conversion method is the same as that in step S5 in the first embodiment, and a repetitive description thereof will be avoided. In step S30, the output unit 208 outputs a color conversion table based on the color space values converted in step S29. This output method is the same as that in step S6 in the first embodiment, and a repetitive description thereof will be avoided.

Operation in Data Acquisition Unit 202

Figure 17:
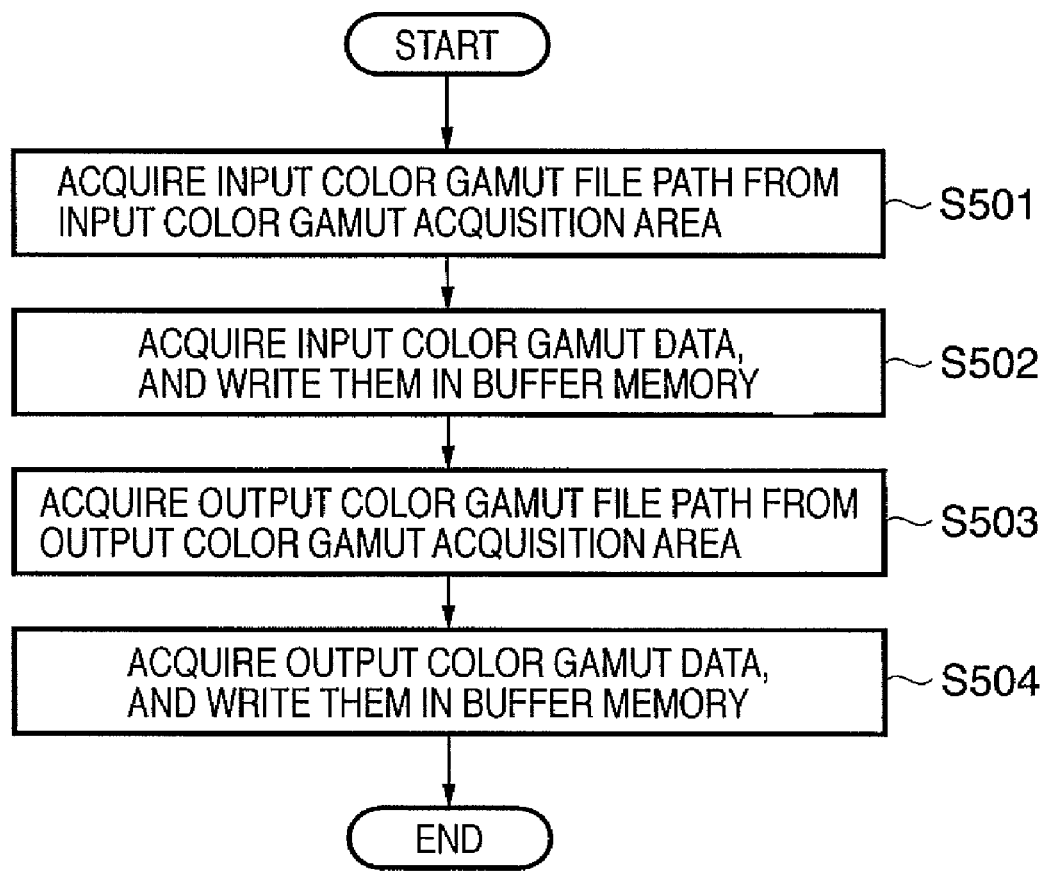
FIG. 17 is a flowchart showing data acquisition processing according to the second embodiment.

The operation of the data acquisition unit 202 in step S22 will be described in detail below with reference to FIG. 17. FIG. 17 is a flowchart showing the data acquisition processing in the data acquisition unit 202.

In step S501, the data acquisition unit 202 acquires the file path of the input color gamut data set in the input color gamut acquisition area 2P shown in FIG. 16. In step S502, the unit 202 loads the input color gamut data held at the file path acquired in step S501 from the color gamut data holding unit 209, and writes them in the buffer memory 210. In step S503, the unit 202 acquires the file path of the output color gamut data set in the output color gamut acquisition area 3P. In step S504, the unit 202 loads the output color gamut data held at the file path acquired in step S503 from the color gamut data holding unit 209, and writes them in the buffer memory 210.

Operation in Reversal Detection Unit 203

Figure 18A:
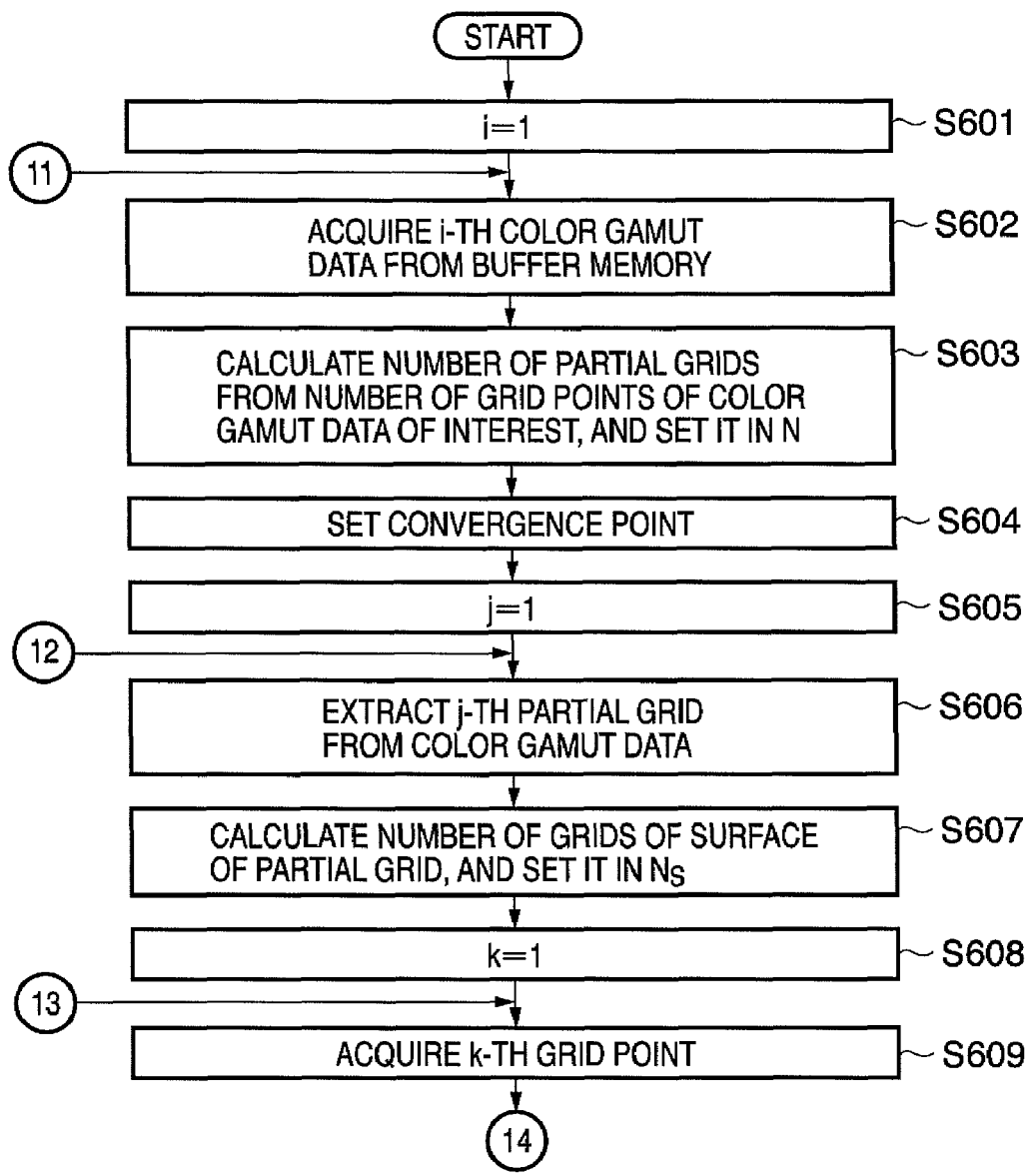
FIGS. 18A and 18B are flowcharts each showing reversal detection processing according to the second embodiment.
Figure 18B:
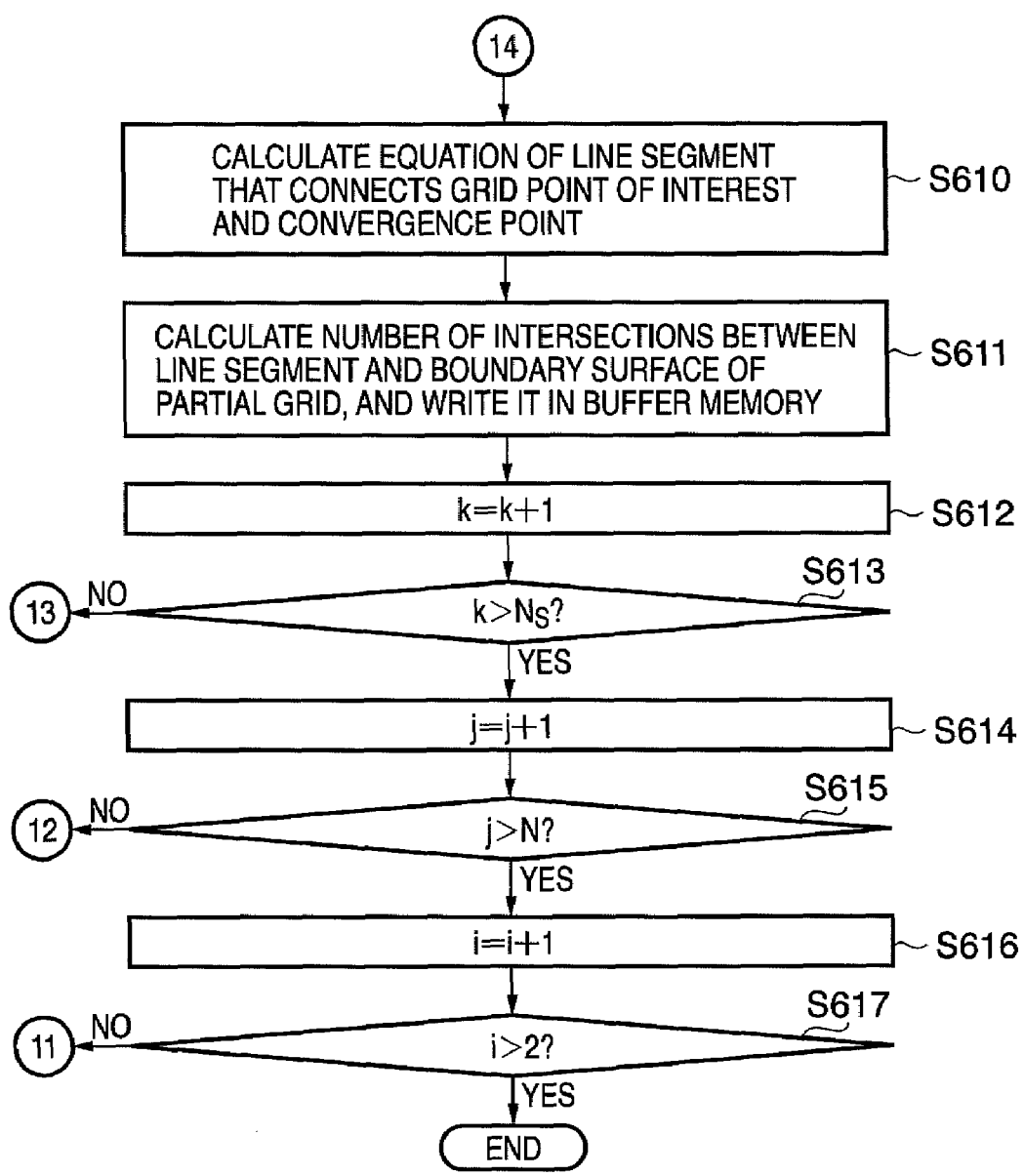

The operation of the reversal detection unit 203 in step S23 will be described in detail below with reference to FIGS. 18A and 18B. FIGS. 18A and 18B are flowcharts each showing the reversal detection processing in the reversal detection unit 203. Note that the processes in step S601 to S603 shown in FIG. 18A are the same as those in steps S201 to S203 shown in FIG. 5A, which shows the reversal detection processing in the first embodiment, and a repetitive description thereof will be avoided.

Upon completion of initialization of a counter i, acquisition of color gamut data of the i-th color gamut, and setting of the number N of partial grids in steps S601 to S603, the reversal detection unit 203 sets a point within the output color gamut, e.g., (50, 0, 0) as a convergence point in step S604. In step S605, the unit 203 substitutes an initial value "1" in a counter j to initialize it. In step S606, the unit 203 extracts the j-th partial grid from the color gamut data acquired in step S602. In step S607, the unit 203 calculates the number of grid points on the boundary surface of the partial grid extracted in step S606, and sets it in Ns Let N be the number of grid points of the color gamut, and i be a natural number. Then, the number of grid points of the i-th partial grid is given by:

$$\text{The number of grid points of } i\text{-th partial grid} = \{\sqrt[3]{N} - 2(i-1)\}^3 \quad (19)$$

Therefore, the number Ns of grid points of the boundary surface of the i-th partial grid is expressed by:

$$N_S = \{\sqrt[3]{N} - 2(i-1)\}^3 - \{\sqrt[3]{N} - 2i\}^3 \quad (20)$$

In step S608, the reversal detection unit 203 substitutes an initial value "1" in a counter k to initialize it. In step S609, the unit 203 acquires the J, a, and b values of the k-th grid point of the boundary surface from the partial grid extracted in step S606. In step S610, the unit 203 calculates an equation of a straight line which connects the grid point and the convergence point set in step S604. In step S611, the unit 203 calculates intersections between the boundary surface of the partial grid and the straight line, and writes the obtained number of intersections in the buffer memory 210.

Figure 19:
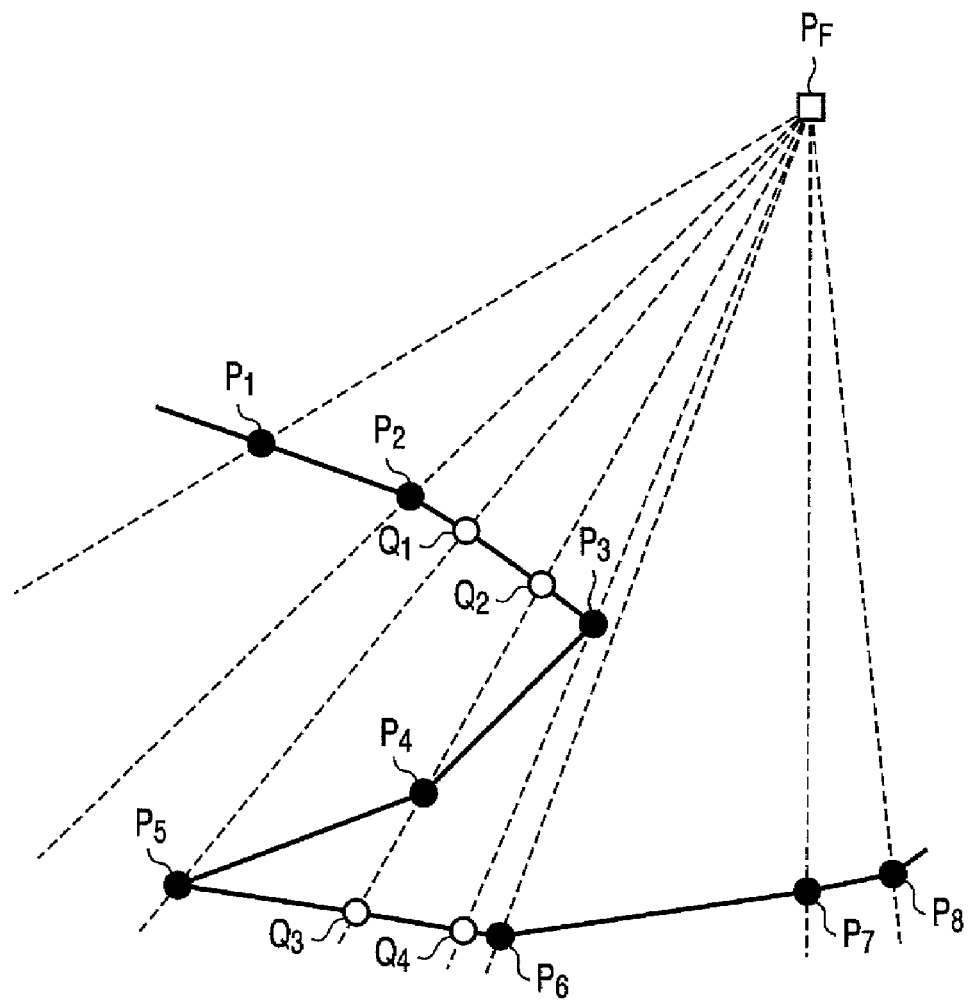
FIG. 19 shows an example of search grid points, a convergence point, and intersections according to the second embodiment.

FIG. 19 shows an example of straight lines which connect grid points and the convergence point, the boundary surface of the partial grid, and their intersections. Referring to FIG. 19, let Pi (i=1, . . . , 8) be a grid point of the boundary surface of the partial grid, PF be the convergence point, and Qj (=1, . . . , 4) be an intersection between a straight line (each of broken lines radially extending from PF) that connects the grid point and convergence point, and the boundary surface. At this time, two or more intersections including the grid point itself exist on the straight line in a hue reversal region, and only the grid point itself exists on the straight line in a region free from any hue reversal. Therefore, the hue reversal of grid points can be determined based on the number of intersections.

Referring back to FIG. 18B, the reversal detection unit 203 increments the counter k by 1 in step S612. The unit 203 checks in step S613 if the processing for all grid points in the partial grid is complete. This checking process uses Ns set in step S607. If the value of the counter k is less than Ns, i.e., if the processing for all grid points in the partial grid is not complete yet, the process returns to step S609. On the other hand, if the value of the counter k exceeds $N_S$, i.e., if the processing for all grid points in the partial grid is complete, the process advances to step S614.

Note that the processes in steps S614 to S617 are the same as those in steps S215 to S218 shown in FIG. 5B in the aforementioned first embodiment, and a repetitive description thereof will be avoided.

As described above, the reversal detection unit 203 of the second embodiment divides the color gamut into partial grids, and calculates straight lines that connect grid points which configure the surface of the partial grid, and the convergence point. The unit 203 then calculates intersections between the straight lines and the boundary surface of the partial grid, and detects the hue reversal of respective grid points based on the number of the intersections. This is the detection method which uses that two or more intersections between the straight line that connects the grid point and the convergence point, and the boundary surface appear when grid points which configure the boundary surface of the partial grid are reversed.

When the hue reversal detection processing is applied not only to the color gamut surface but also grid points inside the color gamut, the hue reversal of grid points inside the color gamut can also be detected.

Since the hue reversal detection processing is applied to grid points, even a slight hue reversal of the color gamut can also be detected. This is the detection method which uses that all the hue reversals of the color gamut can be detected by inspecting the presence/absence of hue reversal for each grid point, since the color gamut is configured by grid points, and the grid points serve as singular points of the color gamut at the same time.

Since the detection processing is applied to only grid points, the hue reversals can be detected at a minimum required search cost. Hence, the hue reversals can be detected at high speed.

Operation in Display Unit 204

Figure 20:
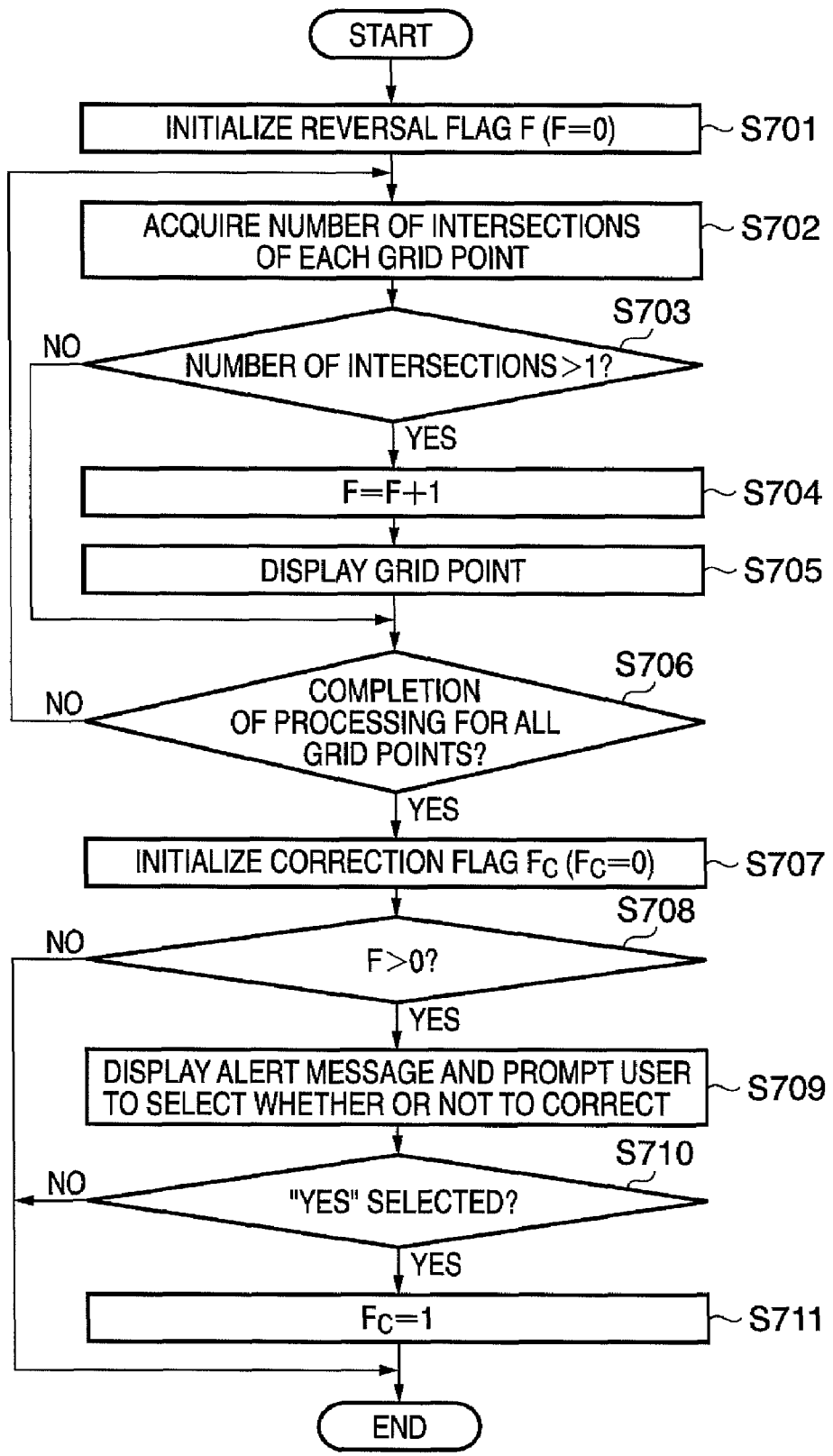
FIG. 20 is a flowchart showing display processing according to the second embodiment.
Figure 21:
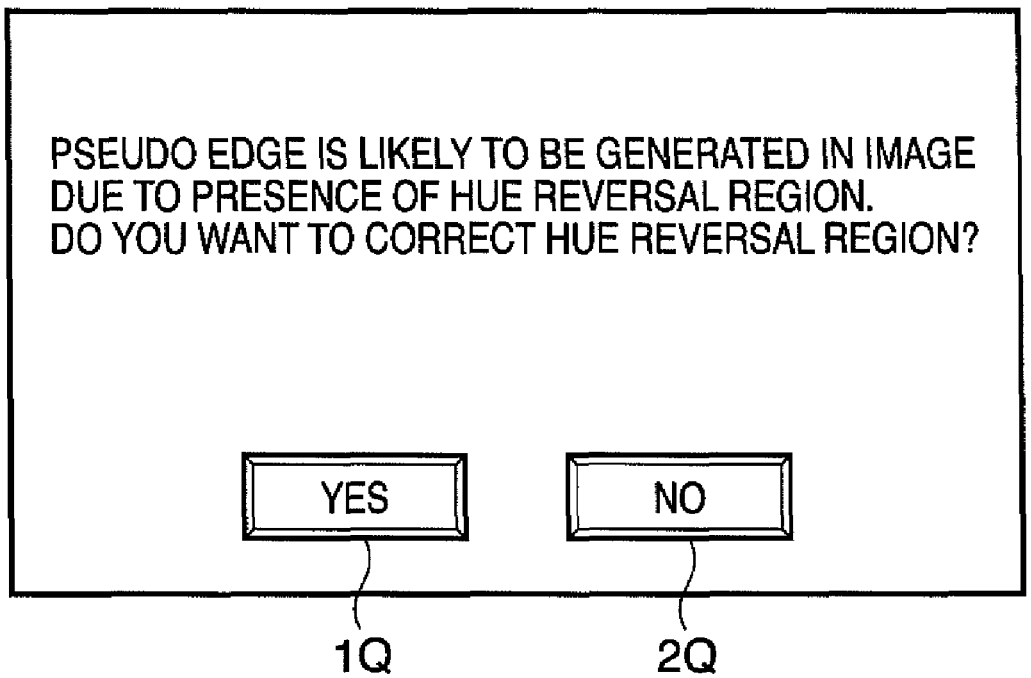
FIG. 21 shows an example of an alert display according to the second embodiment.
Figure 22:
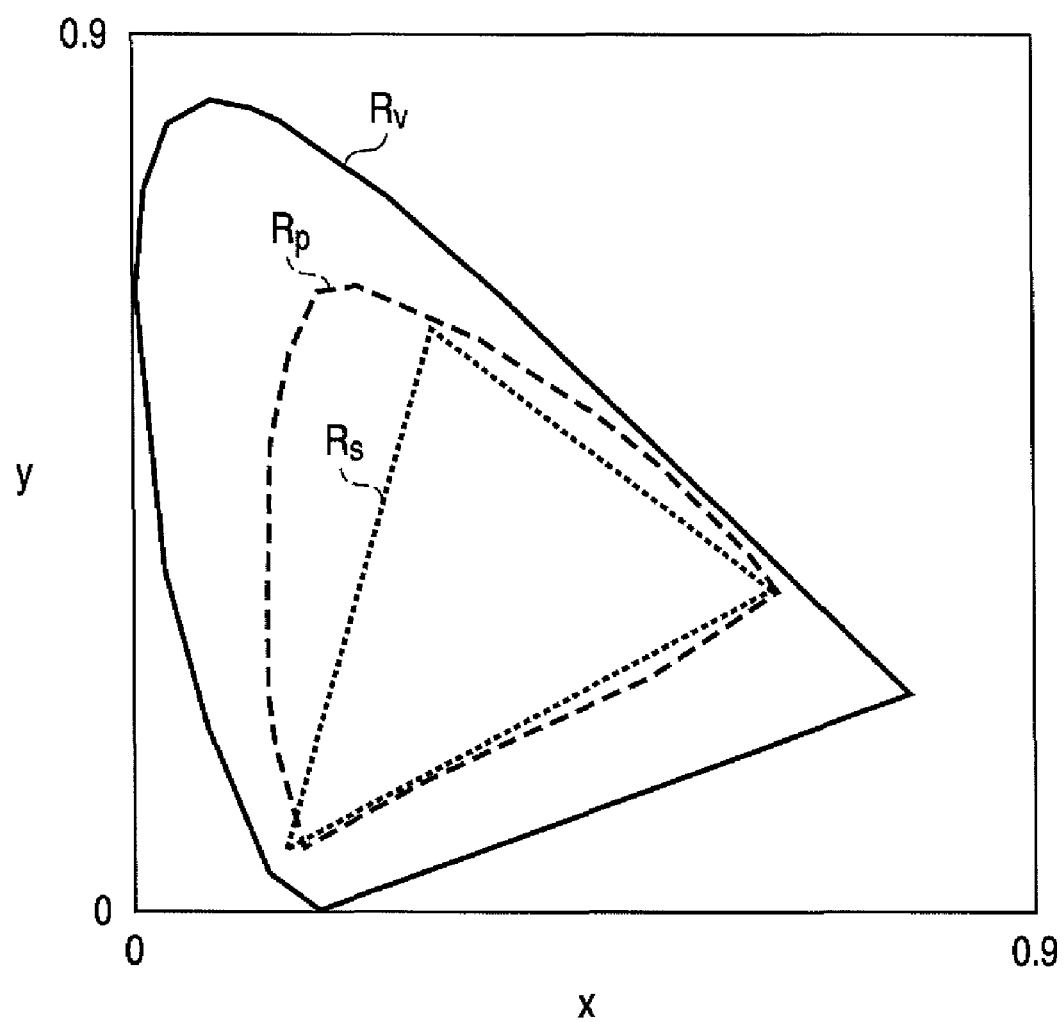
FIG. 22 shows the general relationship among color gamuts.
Figure 23:
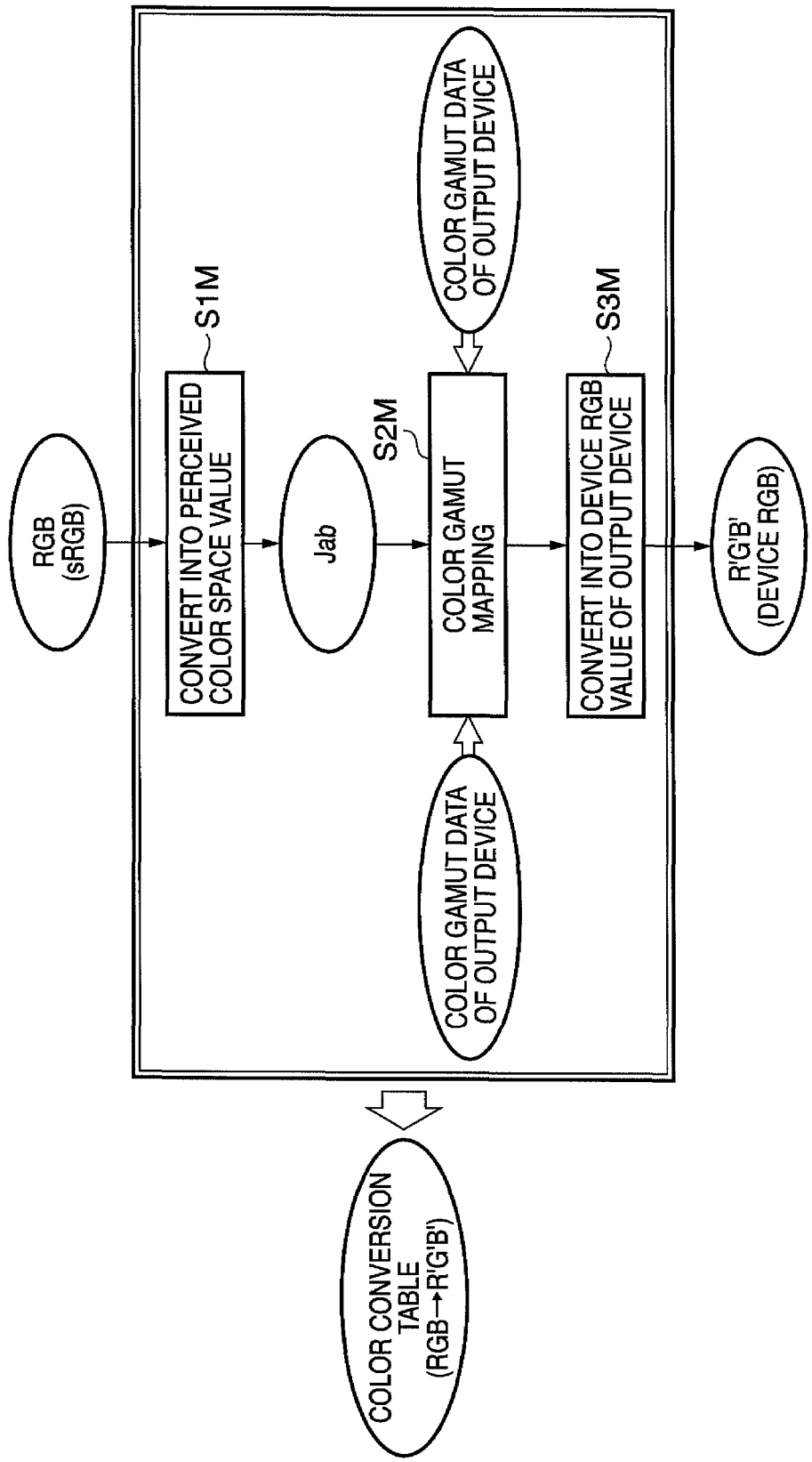
FIG. 23 is a chart showing the general sequence of color gamut mapping of an RGB image.
Figure 24:
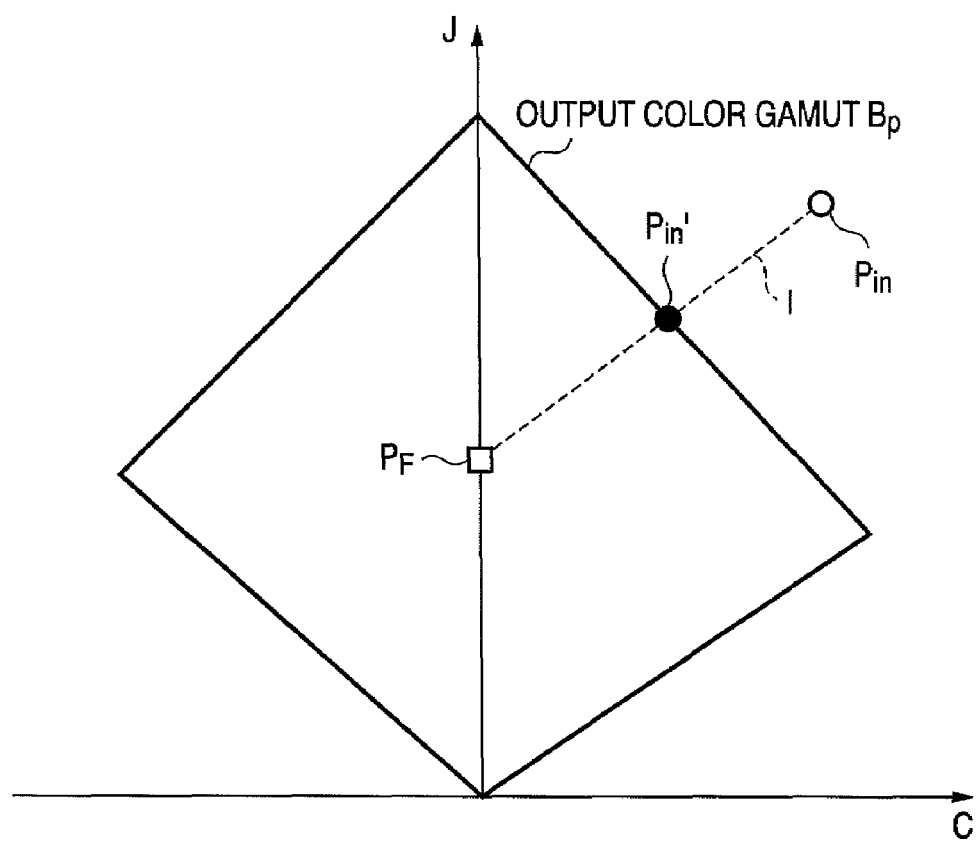
FIG. 24 shows a general example of convergence point mapping.
Figure 25:
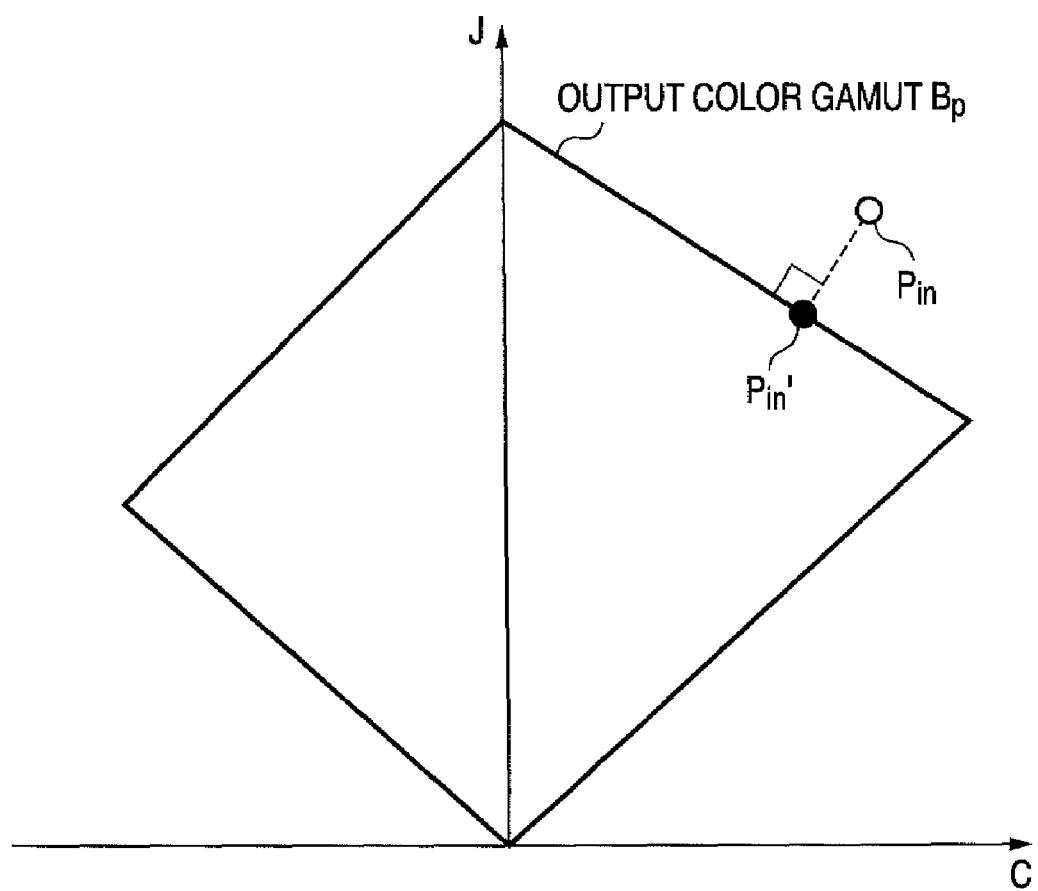
FIG. 25 shows a general example of minimum color difference mapping.
Figure 26:
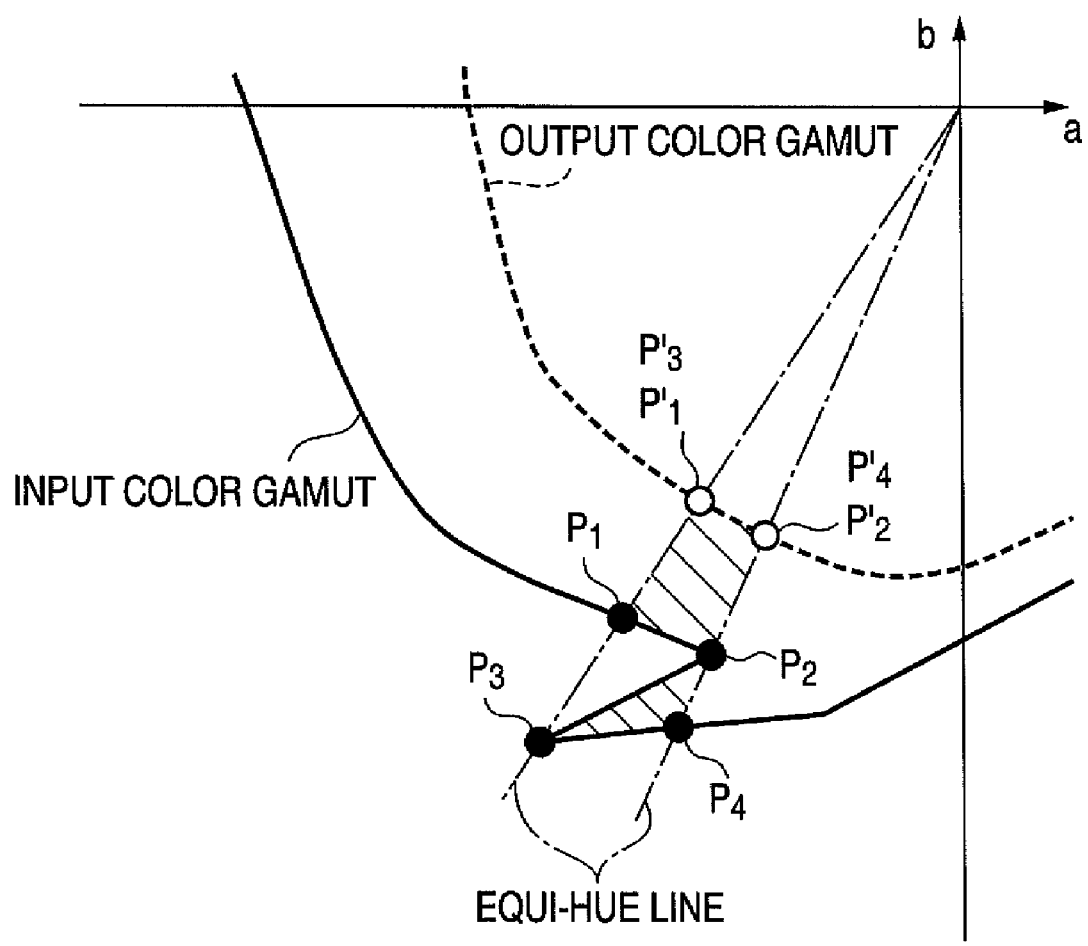
FIG. 26 shows a general example of tone deterioration in a hue reversal region.

The operation of the display unit 204 in step S25 will be described in detail below with reference to FIG. 20. FIG. 20 is a flowchart showing the display processing in the display unit 204 of the second embodiment.

In step S701, the display unit 204 substitutes an initial value "0" in a reversal flag F to initialize it. This reversal flag F is used to alert the user the possibility of the hue reversal in step S708 to be described later. In the second embodiment, when the reversal flag F is zero, it indicates the absence of reversal; when F is 1 or more, it indicates the presence of reversal.

In step S702, the display unit 204 acquires the number of intersections of each grid point from the buffer memory 210. The unit 204 checks the presence/absence of the hue reversal of that grid point based on the number of intersections in step S703. If the number of intersections exceeds 1, i.e., if a hue reversal has occurred at that grid point, the process advances to step S704. On the other hand, if the number of intersections is 1 or less, i.e., if no hue reversal has occurred at that grid point, the process jumps to step S706.

In step S704, the display unit 204 adds 1 to the reversal flag F. In step S705, the unit 204 plots that grid point on the a-b plane of the color gamut display area 42 of the UI unit 201.

The display unit 204 checks in step S706 if the processing for all grid points is complete. If the processing is complete, the process advances to step S707; otherwise, the process returns to step S702.

In step S707, the display unit 204 substitutes an initial value "0" in a correction flag $F_C$ to initialize it. This correction flag $F_C$ is used to check whether or not to correct the hue reversal region, and is set by a user's decision in step S709 to be described later.

In step S708, the display unit 204 checks the presence/absence of the reversal region based on the reversal flag F. If the reversal flag F exceeds zero, i.e., if the reversal region exists, the process advances to step S709. On the other hand, if the reversal flag F is 0 or less, i.e., no reversal region exists, the processing in step S25 ends.

In step S709, the display unit 204 displays an alert message to the user, and prompts him or her to select whether or not to correct the reversal region. As the alert to the user, a message box is displayed to have contents informing that image quality may deteriorate due to the hue reversal region since the hue reversal region exists in the color gamut, and prompting the user to select whether or not to correct the color gamut. This message box comprises a "YES" button 1Q and "NO" button 2Q to acquire the user's decision.

The display unit 204 checks in step S710 if the user presses either the "YES" button 1Q or "NO" button 2Q on the message box displayed in step S709. If the user presses the "YES" button 1Q, the process advances to step S711 to set "1" in the correction flag $F_C$, thus ending the processing in step S25. On the other hand, if the user presses the "NO" button 2Q, the processing in step S25 ends.

As described above, the display unit 204 checks the presence/absence of hue reversal based on the number of intersections of each grid point set in step S23. If the hue reversal has occurred at that grid point, the unit 204 plots that grid point on the color gamut display area 4P of the UI unit 201, thus visually informing the user of the hue reversal region. Furthermore, the unit 204 alerts the user the possibility of deterioration of image quality due to the hue reversal, and the user can select whether or not to correct the hue reversal region.

As described above, according to the second embodiment, upon creating the color conversion table required to convert the input color space values into the output color space values, the color gamut of an input device can be automatically mapped on that of an output device based on the conditions set by the user. Furthermore, the hue reversal of the color gamut is detected upon mapping, and the user can be notified of the possibility of deterioration of image quality due to the hue reversal.

Since the UI comprises the selection buttons that allow the user to select whether or not to correct the reversal region together with the notification message, the user can select whether or not to execute the correction processing. Since the UI comprises the display area which displays the hue reversal region on the a-b plane, the user can visually recognize the region of hue reversal.

Modification

The UI described in the second embodiment may be combined with the first embodiment.

In each of the above embodiments, the reversal detection processing is applied to both the input and output color gamuts. However, the reversal detection processing may be applied to only the output color gamut depending on the algorithm of gamut mapping. A reversal detection processing target may be set according to gamut mapping.

In each of the above embodiments, a hue reversal is detected. However, the present invention is not limited to detection of the hue reversal, and a lightness reversal may be detected. That is, the present invention can be applied to detection of reversals associated with various characteristics about color tone indicating the continuity of colors.

Figure 27:
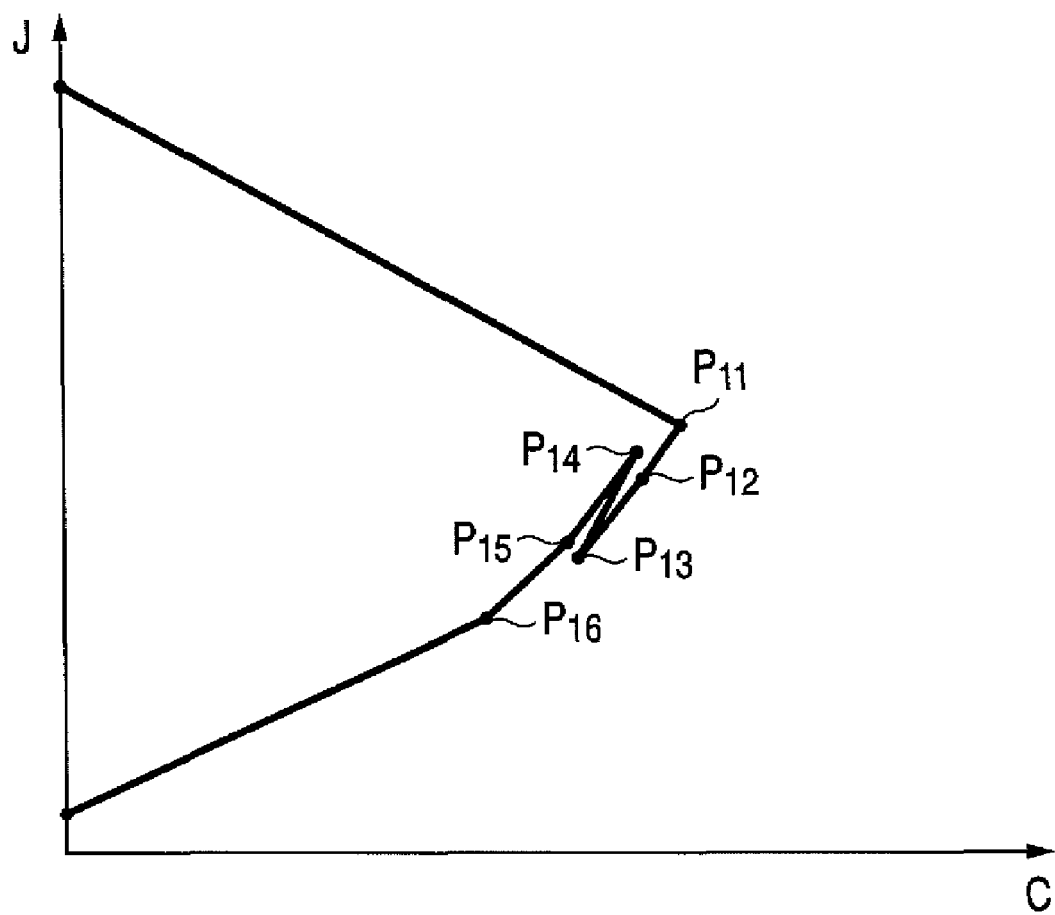
FIG. 27 shows a J-C plane.
Figure 28:
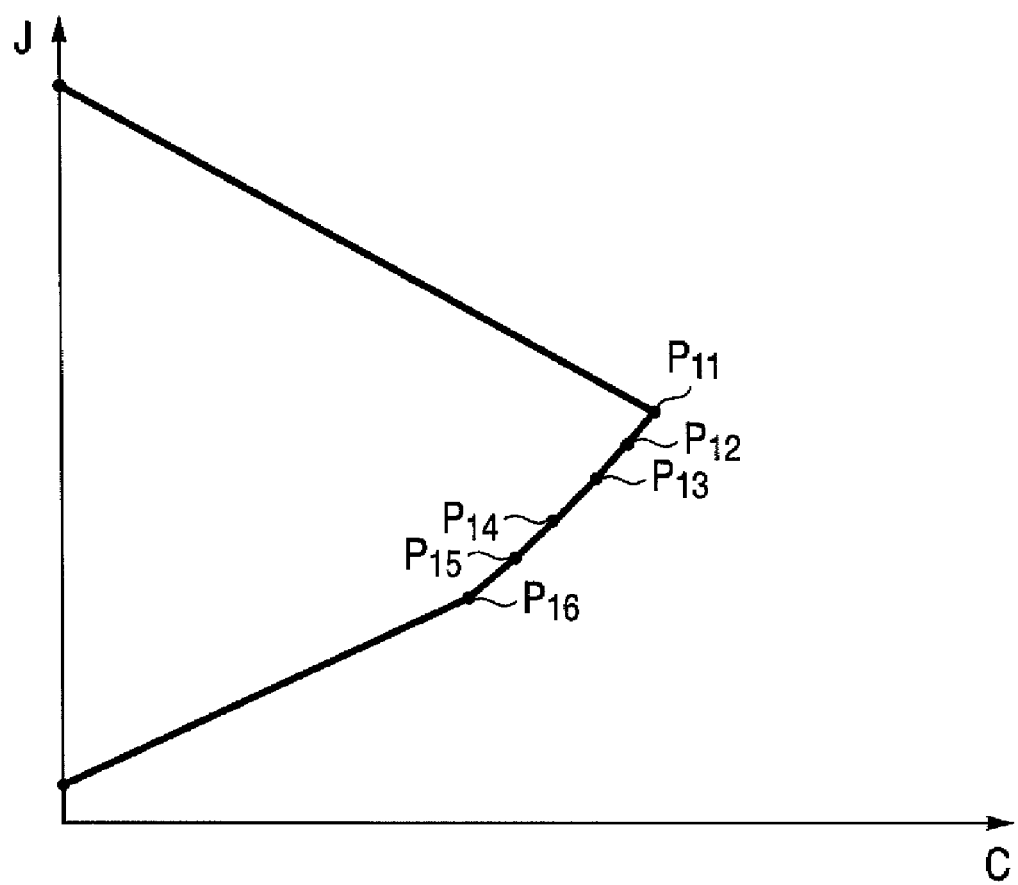
FIG. 28 shows a J-C plane as a result of application of the region correction processing according to each embodiment.

One example of the reversal detection processing of the lightness of a color will be described below. FIG. 27 shows a J-C plane. Referring to FIG. 27, reference numerals P1 to P16 denote grid points near a lightness reversal region. In FIG. 27, lightness reversals occur at the grid points P12 to P15. By applying the reversal detection processing according to each embodiment to the color gamut plotted on the J-C plane shown in FIG. 27, the lightness reversal region can be detected. Then, by applying the region correction processing according to each embodiment, any tone reversal can be removed, as shown in FIG. 28. The description of each of the above embodiments has been given using the CIECAM02 color space. However, any other color spaces may be used as long as they are perceived color spaces such as CIELAB, CIELUV, CIECAM97s, and the like.

In the reversal detection units 102 and 203, and the region correction units 103 and 205, the search grid points are searched in the order from point 1 to point 6, as described in step S206 in FIG. 5A. However, the search order is not limited to this. For example, a search may start from point 2 in the order of points 3, 4, 5, 6, and 1, and may finally return to point 2.

In the region correction units 103 and 205, the example in which hue reversal grid points are shifted onto the straight lines that connects the boundary grid points on the two ends which sandwich these hue reversal grid points upon correcting the hue reversal region has been described. However, the present invention is not limited to such example. For example, hue reversal grid points and boundary grid points may be shifted to two grid points which sandwich these reversal grid points and boundary grid points. Also, the shift destinations of the hue reversal grid points are not limited to positions on the straight line. For example, a quartic function which passes boundary grid points, and two grid points which sandwich the boundary grid points may be defined, and positions on a curve of the quartic function may be set as the shift destinations. By shifting the grid points onto the curve, tones of the boundary between the correction region and non-correction region can be smoothly connected.

In the reversal detection units 102 and 203 and color gamut mapping units 104 and 206, the example in which the J, a, and B values of the convergence point are set to be (50, 0, 0) has been described. However, the coordinates to be set as the convergence point are not particularly limited as long as they fall within the output color gamut. Preferably, the convergence point is set at a middle point between a white point of the output color gamut, i.e., a point where (R, G, B)=(255, 255, 255), and a black point, i.e., a point where (R, C, B)=(0, 0, 0). Alternatively, the convergence point may be set at a gray point of the input or output color gamut, i.e., a point where (R, G, B)=(128, 128, 128), or the barycenter of the input color gamut or a point near the center of the output color gamut such as the barycenter of the output color gamut or the like.

In the color gamut mapping units 104 and 206, the technique which preserves the color values of input grid points inside the output color gamut, and pastes input grid points outside the output color gamut to intersections between line segments that connects the input grid points and a predetermined convergence point, and the boundary surface, has been explained. However, the present invention is not limited to such specific technique. For example, input grid points may be pasted on the boundary surface while maintaining their lightness values or while minimizing the three-dimensional distances on the CIECAM02 color space before and after mapping of the input grid points. Also, colors inside the output color gamut need not always be perfectly preserved, and input grid points both inside and outside the output color gamut may be mapped on preferred colors. Furthermore, a masking technique using a conversion matrix that associates the color values on a first color space with those on a second color space may be used.

The arrangements described in the aforementioned embodiments may be combined with each other without departing from the scope of the present invention.

Other Embodiments

The embodiments have been explained in detail.

The present invention can adopt embodiments in the forms of a system, apparatus, method, program, storage medium (recording medium), and the like. More specifically, the present invention can be applied to either a system constituted by a plurality of devices (e.g., a host computer, interface device, image sensing device, Web application, and the like), or an apparatus consisting of a single device.

Note that the present invention can also be achieved by directly or remotely supplying a program of software that implements the functions of the aforementioned embodiments to a system or apparatus, and reading out and executing the supplied program code by a computer of that system or apparatus. The program in this case is that corresponding to each illustrated flowchart in the embodiments.

Therefore, the program code itself installed in a computer to implement the functional processing of the present invention using the computer, also implements the present invention. Put differently, the present invention includes the computer program itself for implementing the functional processing of the present invention.

In this case, the form of program is not particularly limited, and an object code, a program to be executed by an interpreter, script data to be supplied to an OS, and the like may be used as long as they have the functions of the program.

As a recording medium for supplying the program, the following media can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As a program supply method, the following method may be used. The user establishes a connection to a home page on the Internet using a browser on a client computer, and downloads the computer program itself of the present invention (or a compressed file including an automatic installation function)

from the home page onto a recording medium such as a hard disk or the like. Also, the program code that forms the program of the present invention may be segmented into a plurality of files, which may be downloaded from different home pages. In other words, the present invention includes a WWW server which makes a plurality of users download a program file required to implement the functional processing of the present invention by the computer.

Also, a storage medium such as a CD-ROM or the like, which stores the encrypted program of the present invention, may be delivered to the user, and the user who has cleared a predetermined condition may be allowed to download key information used to decrypt the encrypted program from a home page via the Internet. The user executes the encrypted program using the downloaded key information to install the program on a computer.

The functions of the aforementioned embodiments can be implemented when the computer executes the readout program. Furthermore, the functions of the aforementioned embodiments can be implemented when an OS or the like running on the computer executes some or all of actual processing operations on the basis of an instruction of that program.

Furthermore, the functions of the aforementioned embodiments can be implemented when the program read out from the recording medium is written in a memory equipped on a function expansion board or a function expansion unit, which is inserted in or connected to the computer, and is then executed. Therefore, a CPU equipped on the function expansion board or function expansion unit can execute some or all of actual processing operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-335076 filed Dec. 12, 2006 which is hereby incorporated by reference herein in its entirety.

What is claimed is:

1. A color processing apparatus comprising:
an acquisition unit constructed to acquire color gamut information;
a detection unit constructed to detect a reversal region where tones are reversed at a boundary of a color gamut indicated by the color gamut information, wherein the tones are reversed from a first point on the boundary of the color gamut to a second point on the boundary of the color gamut;
a correction unit constructed to correct the color gamut based on the detected reversal region; and
a gamut mapping unit constructed to execute gamut mapping for input colors based on the corrected color gamut.

2. The apparatus according to claim 1, wherein said detection unit detects a reversal region where hues are reversed on the color gamut indicated by the color gamut information.

3. The apparatus according to claim 1, wherein said detection unit detects a hue reversal based on the number of intersections between a line segment that connects color gamut data which are plotted on a hue-saturation plane and are included in the color gamut information, and straight lines which pass through the color gamut data and are perpendicular to a hue axis.

4. The apparatus according to claim 1, wherein said detection unit detects a hue reversal based on the number of intersections between the color gamut indicated by the color gamut information, and line segments that connect color gamut data included in the color gamut information and a convergence point set inside the color gamut.

5. The apparatus according to claim 1, wherein said correction unit corrects a region including the reversal region.

6. The apparatus according to claim 1, wherein said correction unit shifts color gamut data in the reversal region onto a line segment defined by color gamut data that sandwich the reversal region.

7. The apparatus according to claim 6, wherein said correction unit shifts the color gamut data in the reversal region based on a ratio of distances among color gamut data included in the reversal region.

8. The apparatus according to claim 1, further comprising an informing unit constructed to inform a user of the reversal region detected by said detection unit.

9. The apparatus according to claim 1, wherein the reversal region comprises a region where tones are reversed in a lightness-saturation plane at the boundary of the color gamut indicated by the color gamut information.

10. A color processing method comprising:
an acquisition step of acquiring color gamut information;
a detection step of detecting a reversal region where tones are reversed at a boundary of a color gamut indicated by the color gamut information, wherein the tones are reversed from a first point on the boundary of the color gamut to a second point on the boundary of the color gamut;
a correction step of correcting the color gamut based on the detected reversal region; and
a gamut mapping step of executing gamut mapping for input colors based on the corrected color gamut.

11. The method according to claim 10, wherein the reversal region comprises a region where tones are reversed in a lightness-saturation plane at the boundary of the color gamut indicated by the color gamut information.

12. A non-transitory computer-readable storage medium storing a program for making a computer execute:
an acquisition step of acquiring color gamut information;
a detection step of detecting a reversal region where tones are reversed at a boundary of a color gamut indicated by the color gamut information, wherein the tones are reversed from a first point on the boundary of the color gamut to a second point on the boundary of the color gamut;
a correction step of correcting the color gamut based on the detected reversal region; and
a gamut mapping step of executing gamut mapping for input colors based on the corrected color gamut.

13. The computer-readable storage medium according to claim 12, wherein the reversal region comprises a region where tones are reversed in a lightness-saturation plane at the boundary of the color gamut indicated by the color gamut information.

* * * * *